(12) United States Patent
Kaneko et al.

(10) Patent No.: US 9,676,600 B2
(45) Date of Patent: Jun. 13, 2017

(54) FORKLIFT AND CONTROL METHOD OF FORKLIFT

(71) Applicant: Komatsu Ltd., Tokyo (JP)

(72) Inventors: Shinji Kaneko, Oyama (JP); Taishi Oiwa, Naka-gun (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/364,178

(22) PCT Filed: Dec. 27, 2013

(86) PCT No.: PCT/JP2013/085246
§ 371 (c)(1),
(2) Date: Jun. 10, 2014

(87) PCT Pub. No.: WO2015/097901
PCT Pub. Date: Jul. 2, 2015

(65) Prior Publication Data
US 2016/0297654 A1  Oct. 13, 2016

(51) Int. Cl.
*G06F 7/70* (2006.01)
*G06F 19/00* (2011.01)
(Continued)

(52) U.S. Cl.
CPC ............ *B66F 9/07572* (2013.01); *B66F 9/22* (2013.01); *F16H 61/431* (2013.01); *B66F 9/072* (2013.01)

(58) Field of Classification Search
CPC ........ B66F 9/06; B66F 9/07559; B66F 11/00; B66F 9/127; B66F 9/07572
(Continued)

(56) References Cited

U.S. PATENT DOCUMENTS 3,633,359 A * 1/1972 Worn .................. F16H 61/4157
60/431
4,108,265 A * 8/1978 Abels .................... F16H 61/423
180/307
(Continued)

FOREIGN PATENT DOCUMENTS

CN  101076636 A  11/2007
CN  102341625 A  2/2012
(Continued)

OTHER PUBLICATIONS

International Seach Report and Written Opinion dated Mar. 25, 2014, issued for PCT/JP2013/085246.

*Primary Examiner* — Jaime Figueroa
(74) *Attorney, Agent, or Firm* — Locke Lord LLP

(57) ABSTRACT

A forklift equipped with a variable displacement traveling hydraulic pump driven by an engine, a hydraulic motor that forms a closed circuit with the traveling hydraulic pump therebetween and is driven by hydraulic oil discharged from the traveling hydraulic pump, and driving wheels driven by the hydraulic motor, when an accelerator opening detected by an accelerator opening sensor is reduced, the accelerator opening detected by the accelerator opening sensor and a target maximum absorption torque of the traveling hydraulic pump are given to a table on which a setting value calculated in advance depending on the accelerator opening, and the target maximum absorption torque of the traveling hydraulic pump or a vehicle speed of the forklift is described to calculate the setting value, and the accelerator opening detected by the accelerator opening sensor is corrected using the obtained setting value to calculate a corrected accelerator opening.

20 Claims, 7 Drawing Sheets

(51) Int. Cl.
*G06G 7/00* (2006.01)
*G06G 7/76* (2006.01)
*B66F 9/075* (2006.01)
*B66F 9/22* (2006.01)
*F16H 61/431* (2010.01)
*B66F 9/07* (2006.01)

(58) Field of Classification Search
USPC .................................................. 701/1, 50
See application file for complete search history.

(56) References Cited

U.S. PATENT DOCUMENTS

| | | | | |
|---|---|---|---|---|
| 4,606,313 | A * | 8/1986 | Izumi | B60W 10/06 123/357 |
| 5,337,629 | A * | 8/1994 | Kita | B60W 10/06 475/72 |
| 5,890,468 | A * | 4/1999 | Ozawa | F02B 37/005 123/561 |
| 7,661,499 | B2 | 2/2010 | Matsuyama | |
| 8,316,983 | B2 | 11/2012 | Shirao | |
| 8,789,644 | B2 | 7/2014 | Shirao et al. | |
| 8,874,327 | B2 * | 10/2014 | Ishihara | E02F 9/2246 701/50 |
| 9,080,503 | B2 * | 7/2015 | Buschur | F02B 37/10 |
| 9,221,657 | B2 * | 12/2015 | Kaneko | B60K 6/00 |
| 2008/0093145 | A1 | 4/2008 | Matsuyama | |
| 2010/0218494 | A1 * | 9/2010 | Yasuda | F04C 14/065 60/459 |
| 2011/0264335 | A1 * | 10/2011 | Zhao | B66F 9/22 701/50 |
| 2011/0308878 | A1 | 12/2011 | Shirao | |
| 2011/0308879 | A1 | 12/2011 | Shirao et al. | |
| 2013/0089399 | A1 * | 4/2013 | Kaneko | F02D 29/04 414/642 |
| 2015/0033718 | A1 * | 2/2015 | Kaneko | F16H 61/431 60/327 |
| 2015/0232312 | A1 * | 8/2015 | Kaneko | B60K 6/00 701/50 |

FOREIGN PATENT DOCUMENTS

| | | |
|---|---|---|
| CN | 102362105 A | 2/2012 |
| JP | 64-040757 A | 2/1989 |
| JP | 04-203674 A | 7/1992 |
| JP | 2011-069406 A | 4/2011 |
| JP | 2012-057664 A | 3/2012 |

* cited by examiner

| As | [%] | As0 | As1 | As2 | As3 | As4 | As5 | As6 | As7 |
|---|---|---|---|---|---|---|---|---|---|
| f | [Hz] | 20.00 | 3.00 | 0.30 | 0.20 | 0.20 | 0.30 | 3.00 | 20.00 |

TBi

| Asc (%) | Asc0 | Asc1 | Asc2 | Asc3 | Asc4 | Asc5 | Asc6 | Asc7 | Asc8 | Asc9 |
|---|---|---|---|---|---|---|---|---|---|---|
| Tm1 | 20.00 | 20.00 | 20.00 | 20.00 | 20.00 | 20.00 | 20.00 | 20.00 | 20.00 | 20.00 |
| Tm2 | 0.75 | 0.75 | 0.75 | 0.75 | 0.75 | 20.00 | 20.00 | 20.00 | 20.00 | 20.00 |
| Tm3 | 0.35 | 0.35 | 0.35 | 0.35 | 0.35 | 0.35 | 20.00 | 20.00 | 20.00 | 20.00 |
| Tm4 | 0.15 | 0.15 | 0.15 | 0.20 | 0.20 | 0.20 | 0.30 | 0.50 | 0.50 | 0.50 |
| Tm5 | 0.15 | 0.15 | 0.15 | 0.20 | 0.20 | 0.20 | 0.30 | 0.50 | 0.50 | 0.50 |

TBd

MAXIMUM ABSORPTION TORQUE

FORKLIFT AND CONTROL METHOD OF FORKLIFT

FIELD

The present invention relates to a forklift having a variable displacement hydraulic pump driven by an engine, and a hydraulic motor that forms a closed circuit with the hydraulic pump therebetween and is driven by hydraulic oil discharged from the hydraulic pump, and a method of controlling the forklift.

BACKGROUND

There have been forklifts provided with a hydraulic driving device called a hydro static transmission device (HST) between an engine as a driving source and driving wheels (for example, see Patent Literature 1). The hydraulic driving device is equipped with a variable displacement traveling hydraulic pump driven by the engine and a variable displacement hydraulic motor driven by hydraulic oil discharged from the traveling hydraulic pump in a main hydraulic circuit as a closed circuit, and allows a vehicle to travel by transmitting the drive of the hydraulic motor to the driving wheels.

CITATION LIST

Patent Literature

Patent Literature 1: Japanese Laid-open Patent Publication No. 2012-57664

SUMMARY

Technical Problem

Unlike a forklift equipped with a torque converter, since there is no general creep traveling in a forklift equipped with an HST, when starting from a stopped state, an operator operates an accelerator pedal. On achieving a fine movement so as to move the forklift equipped with the HST back and forth by approximately several centimeters, when the operator performs operation of releasing just after stepping on the accelerator pedal to finely adjust a position thereof, it is preferred that deceleration force of the forklift rapidly increase by releasing the accelerator pedal. The technique described in Patent Literature 1 is capable of smoothly starting a vehicle without a time lag with respect to the accelerator operation, but Patent Literature 1 does not disclose a technique of rapidly increasing the deceleration force of the forklift when releasing the accelerator pedal, and there is room for improvement.

An object of the invention is to easily achieve fine positioning operation during low-speed traveling in the forklift equipped with the HST.

Solution to Problem

According too the present invention, a forklift equipped with a variable displacement traveling hydraulic pump driven by an engine, a hydraulic motor that forms a closed circuit with the traveling hydraulic pump therebetween and is driven by hydraulic oil discharged from the traveling hydraulic pump, and driving wheels driven by the hydraulic motor, the forklift comprises: an accelerator operation unit that performs operation for increasing or decreasing an amount of fuel supplied to the engine; an accelerator opening sensor that detects an accelerator opening which is an operation amount of the accelerator operation unit; and a control device that has a modulation control unit configured to calculate a value delayed depending on a setting value of a cut-off frequency or a time constant of the accelerator opening as a corrected accelerator opening, and a target maximum absorption torque setting unit configured to calculate a target maximum absorption torque of the traveling hydraulic pump or a target swash plate tilting angle of a swash plate provided in the traveling hydraulic pump depending on the corrected accelerator opening, and controls the traveling hydraulic pump, wherein the modulation control unit calculates, with reference to a table on which the setting value of the cut-off frequency or the time constant according to at least the corrected accelerator opening is described, the setting value by a corrected accelerator opening obtained at a previous control cycle, and calculates a corrected accelerator opening of a current control cycle by correcting the accelerator opening detected by the accelerator opening sensor using the obtained setting value, and the target maximum absorption torque setting unit calculates the target maximum absorption torque or the target swash plate tilting angle depending on the corrected accelerator opening of the current control cycle.

According to the present invention, a forklift equipped with a variable displacement traveling hydraulic pump driven by an engine, a hydraulic motor that forms a closed circuit with the traveling hydraulic pump therebetween and is driven by hydraulic oil discharged from the traveling hydraulic pump, and driving wheels driven by the hydraulic motor, the forklift comprises: an accelerator operation unit that performs operation for increasing or decreasing an amount of fuel supplied to the engine; an accelerator opening sensor that detects an accelerator opening which is an operation amount of the accelerator operation unit; and a control device that has a modulation control unit configured to calculate a value delayed depending on a setting value of a cut-off frequency or a time constant of the accelerator opening as a corrected accelerator opening, and a target maximum absorption torque setting unit configured to calculate a target maximum absorption torque of the traveling hydraulic pump or a target swash plate tilting angle of a swash plate provided in the traveling hydraulic pump depending on the corrected accelerator opening, and controls the traveling hydraulic pump, wherein the modulation control unit calculates, with reference to a table on which the setting value of the cut-off frequency or the time constant according to the corrected accelerator opening, and the target maximum absorption torque of the traveling hydraulic pump, the target swash plate tilting angle of the swash plate, or a vehicle speed of the forklift is described, the setting value by a corrected accelerator opening obtained at a previous control cycle and the target maximum absorption torque of the traveling hydraulic pump or the target swash plate tilting angle, and calculates a corrected accelerator opening of a current control cycle by correcting the accelerator opening detected by the accelerator opening sensor using the obtained setting value, and the target maximum absorption torque setting unit calculates the target maximum absorption torque or the target swash plate tilting angle depending on the corrected accelerator opening of the current control cycle.

According to the present invention, a forklift equipped with a variable displacement traveling hydraulic pump driven by an engine, a hydraulic motor that forms a closed circuit with the traveling hydraulic pump therebetween and is driven by hydraulic oil discharged from the traveling hydraulic pump, and driving wheels driven by the hydraulic motor, the forklift comprises: an accelerator operation unit that performs operation for increasing or decreasing an amount of fuel supplied to the engine; an accelerator opening sensor that detects an accelerator opening which is an operation amount of the accelerator operation unit; and a control device that has a modulation control unit configured to calculate a value delayed depending on a setting value of a cut-off frequency or a time constant of the accelerator opening as a corrected accelerator opening, and a target maximum absorption torque setting unit configured to calculate a target maximum absorption torque of the traveling hydraulic pump or a target swash plate tilting angle of a swash plate provided in the traveling hydraulic pump depending on the corrected accelerator opening, and controls the traveling hydraulic pump, wherein when the accelerator opening detected by the accelerator opening sensor decreases, the modulation control unit calculates, with reference to a table on which the setting value of the cut-off frequency or the time constant is described, the setting value being set in advance depending on the corrected accelerator opening, and the target maximum absorption torque of the traveling hydraulic pump, the target swash plate tilting angle of the swash plate provided in the traveling hydraulic pump or a vehicle speed of the forklift, the setting value by a corrected accelerator opening obtained at a previous control cycle, and a target maximum absorption torque of the traveling hydraulic pump or the target swash plate tilting angle, and the modulation control unit calculates a corrected accelerator opening of a current control cycle by correcting the accelerator opening detected by the accelerator opening sensor using the obtained setting value, and the target maximum absorption torque setting unit calculates the target maximum absorption torque or the target swash plate tilting angle depending on the corrected accelerator opening of the current control cycle.

In the present invention, it is preferable that the setting value of the cut-off frequency or the time constant is determined so that as the target maximum absorption torque, the target swash plate tilting angle or the vehicle speed decreases, responsiveness of the traveling hydraulic pump rises.

In the present invention, it is preferable that the setting value of the cut-off frequency or the time constant is determined so that as the target maximum absorption torque, the target swash plate tilting angle or the vehicle speed decreases, responsiveness of the traveling hydraulic pump rises, and as the accelerator opening decreases, the responsiveness falls.

In the present invention, it is preferable that the modulation control unit maintains the target maximum absorption torque or the target swash plate tilting angle used when referring to the table at a value of a timing at which the accelerator opening sensor detects a decrease in the accelerator opening, and when the accelerator opening sensor detects an increase in the accelerator opening, the modulation control unit releases the maintenance.

According to the present invention, a forklift equipped with a variable displacement traveling hydraulic pump driven by an engine, a hydraulic motor that forms a closed circuit with the traveling hydraulic pump therebetween and is driven by hydraulic oil discharged from the traveling hydraulic pump, and driving wheels driven by the hydraulic motor, the forklift comprises: an accelerator operation unit that performs operation for increasing or decreasing an amount of fuel supplied to the engine; an accelerator opening sensor that detects an accelerator opening which is an operation amount of the accelerator operation unit; and a control device that has a modulation control unit configured to calculate a value delayed depending on a setting value of a cut-off frequency or a time constant of the accelerator opening as a corrected accelerator opening, and a target maximum absorption torque setting unit configured to calculate a target maximum absorption torque of the traveling hydraulic pump or a target swash plate tilting angle of a swash plate provided in the traveling hydraulic pump depending on the corrected accelerator opening, and controls the traveling hydraulic pump, wherein the modulation control unit calculates, with reference to a first table on which a first setting value of the cut-off frequency or the time constant according to the corrected accelerator opening, and the target maximum absorption torque of the traveling hydraulic pump, the target swash plate tilting angle of the swash plate or a vehicle speed of the forklift is described, a first setting value by a corrected accelerator opening obtained at a previous control cycle and the target maximum absorption torque or the target swash plate tilting angle of the traveling hydraulic pump, and calculates a corrected accelerator opening of a current control cycle by correcting the accelerator opening detected by the accelerator opening sensor using the obtained first setting value, the modulation control unit calculates, with reference to a second table on which a second setting value of the cut-off frequency or the time constant according to the accelerator opening is described, a second setting value by the accelerator opening detected by the accelerator opening sensor and the target maximum absorption torque of the traveling hydraulic pump or the target swash plate tilting angle, and calculates a corrected accelerator opening of a current control cycle by correcting the accelerator opening detected by the accelerator opening sensor using the obtained second setting value, the modulation control unit selects one of the calculations of the first and second setting values to calculate the corrected accelerator opening of the current control cycle by correcting the accelerator opening detected by the accelerator opening sensor using corresponding one of the obtained first and second setting values based on an operation amount of the accelerator operation unit, and the target maximum absorption torque setting unit calculates the target maximum absorption torque or the target swash plate tilting angle depending on the corrected accelerator opening of the current control cycle.

According to the present invention, a forklift equipped with a variable displacement traveling hydraulic pump driven by an engine, a hydraulic motor that forms a closed circuit with the traveling hydraulic pump therebetween and is driven by hydraulic oil discharged from the traveling hydraulic pump, and driving wheels driven by the hydraulic motor, the forklift comprises: an accelerator operation unit that performs operation for increasing or decreasing an amount of fuel supplied to the engine; an accelerator opening sensor that detects an accelerator opening which is an operation amount of the accelerator operation unit; and a control device that has a modulation control unit configured to calculate a value delayed depending on a setting value of a cut-off frequency or a time constant of the accelerator opening as a corrected accelerator opening, and a target maximum absorption torque setting unit configured to calculate a target maximum absorption torque of the traveling hydraulic pump or a target swash plate tilting angle of a swash plate provided in the traveling hydraulic pump depending on the corrected accelerator opening, and controls the traveling hydraulic pump, wherein when the accelerator opening detected by the accelerator opening sensor increases, the modulation control unit calculates, with reference to a first table on which a first setting value of the cut-off frequency or the time constant according to the accelerator opening, the target maximum absorption torque of the traveling hydraulic pump, the target swash plate tilting angle of the swash plate or a vehicle speed of the forklift is described, the first setting value by a corrected accelerator opening obtained at a previous control cycle and the target maximum absorption torque of the traveling hydraulic pump or the target swash plate tilting angle and calculates a corrected accelerator opening of a current control cycle by correcting the accelerator opening detected by the accelerator opening sensor using the obtained first setting value, when the accelerator opening detected by the accelerator opening sensor decreases, the modulation control unit calculates, with reference to a second table on which a second setting value of the cut-off frequency or the time constant according to the accelerator opening is described, the second setting value by the accelerator opening detected by the accelerator opening sensor and the target maximum absorption torque of the traveling hydraulic pump or the target swash plate tilting angle and calculates a corrected accelerator opening of a current control cycle by correcting the accelerator opening detected by the accelerator opening sensor using the obtained second setting value, and the target maximum absorption torque setting unit calculates the target maximum absorption torque or the target swash plate tilting angle depending on the corrected accelerator opening of the current control cycle.

In the present invention, it is preferable that the first setting value of the cut-off frequency or the time constant is determined so that as the target maximum absorption torque, the target swash plate tilting angle or the vehicle speed decreases, responsiveness of the traveling hydraulic pump rises, and when the second setting value is determined so that when the accelerator opening increases, as the accelerator opening increases, the responsiveness falls and then rises again.

In the present invention, it is preferable that wherein the first setting value of the cut-off frequency or the time constant is determined so that as the target maximum absorption torque, the target swash plate tilting angle or the vehicle speed decreases, responsiveness of the traveling hydraulic pump rises, and as the accelerator opening decreases, the responsiveness falls, and the second setting value is determined so that when the accelerator opening increases, as the accelerator opening increases, the responsiveness falls and then rises again.

According to the present invention, a method of controlling a forklift equipped with a variable displacement traveling hydraulic pump driven by an engine, a hydraulic motor that forms a closed circuit with the traveling hydraulic pump therebetween and is driven by hydraulic oil discharged from the traveling hydraulic pump, driving wheels driven by the hydraulic motor, an accelerator operation unit that performs operation for increasing or decreasing an amount of fuel supplied to the engine, and an accelerator opening sensor configured to detect an accelerator opening that is an operation amount of the accelerator operation unit, the method comprises: when calculating a value delayed depending on a setting value of a cut-off frequency or a time constant of the accelerator opening as a corrected accelerator opening and calculating a target maximum absorption torque of the traveling hydraulic pump or a target swash plate tilting angle of a swash plate provided in the traveling hydraulic pump depending on the corrected accelerator opening to control the traveling hydraulic pump, calculating the setting value by a corrected accelerator opening obtained at a previous control cycle, with reference to a table on which the setting value of the cut-off frequency or the time constant according to at least the corrected accelerator opening is described, calculating a corrected accelerator opening of a current control cycle by correcting the accelerator opening detected by the accelerator opening sensor using the obtained setting value, and controlling the traveling hydraulic pump by calculating the target maximum absorption torque or the target swash plate tilting angle depending on the corrected accelerator opening of the current control cycle.

According to the present invention, a method of controlling a forklift equipped with a variable displacement traveling hydraulic pump driven by an engine, a hydraulic motor that forms a closed circuit with the traveling hydraulic pump therebetween and is driven by hydraulic oil discharged from the traveling hydraulic pump, driving wheels driven by the hydraulic motor, an accelerator operation unit that performs operation for increasing or decreasing an amount of fuel supplied to the engine, and an accelerator opening sensor configured to detect an accelerator opening that is an operation amount of the accelerator operation unit, the method comprises: when calculating a value delayed depending on a setting value of a cut-off frequency or a time constant of the accelerator opening as a corrected accelerator opening and calculating a target maximum absorption torque of the traveling hydraulic pump or a target swash plate tilting angle of a swash plate provided in the traveling hydraulic pump depending on the corrected accelerator opening to control the traveling hydraulic pump, calculating, with reference to a table on which the setting value of the cut-off frequency or the time constant according to the corrected accelerator opening, the target maximum absorption torque of the traveling hydraulic pump, the target swash plate tilting angle of the swash plate or a vehicle speed of the forklift is described, the setting value by a corrected accelerator opening obtained at a previous control cycle of the traveling hydraulic pump and the target maximum absorption torque or the target swash plate tilting angle, calculating a corrected accelerator opening of a current control cycle by correcting the accelerator opening detected by the accelerator opening sensor using the obtained setting value, and calculating the target maximum absorption torque or the target swash plate tilting angle depending on the corrected accelerator opening of the current control cycle to control the traveling hydraulic pump.

According to the present invention, a method of controlling a forklift equipped with a variable displacement traveling hydraulic pump driven by an engine, a hydraulic motor that forms a closed circuit with the traveling hydraulic pump therebetween and is driven by hydraulic oil discharged from the traveling hydraulic pump, driving wheels driven by the hydraulic motor, an accelerator operation unit that performs operation for increasing or decreasing an amount of fuel supplied to the engine, and an accelerator opening sensor configured to detect an accelerator opening that is an operation amount of the accelerator operation unit, the method comprises: when calculating a value delayed depending on a setting value of a cut-off frequency or a time constant of the accelerator opening as a corrected accelerator opening and calculating a target maximum absorption torque of the traveling hydraulic pump or a target swash plate tilting angle of a swash plate provided in the traveling hydraulic pump depending on the corrected accelerator opening to control the traveling hydraulic pump, in a case where the accelerator opening detected by the accelerator opening sensor decreases, calculating, with reference to a table on which the setting value of the cut-off frequency or the time constant is described, the setting value by a corrected accelerator opening obtained at a previous control cycle and the target maximum absorption torque of the traveling hydraulic pump or the target swash plate tilting angle, the setting value being set in advance depending on the accelerator opening, the target maximum absorption torque of the traveling hydraulic pump, the target swash plate tilting angle of a swash plate provided in the traveling hydraulic pump or a vehicle speed of the forklift, calculating a corrected accelerator opening of a current control cycle by correcting the accelerator opening detected by the accelerator opening sensor using the obtained setting value, and calculating the target maximum absorption torque or the target swash plate tilting angle depending on the corrected accelerator opening of the current control cycle to control the traveling hydraulic pump.

In the present invention, it is preferable that the setting value of the cut-off frequency or the time constant is determined so that as the target maximum absorption torque, the target swash plate tilting angle or the vehicle speed decreases, responsiveness of the traveling hydraulic pump rises.

In the present invention, it is preferable that the setting value of the cut-off frequency or the time constant is determined so that as the target maximum absorption torque, the target swash plate tilting angle or the vehicle speed decreases, responsiveness of the traveling hydraulic pump rises, and as the accelerator opening decreases, the responsiveness falls.

In the present invention, it is preferable that the modulation control unit maintains the target maximum absorption torque or the target swash plate tilting angle used when referring to the table at a value of a timing at which the accelerator opening sensor detects a decrease in the accelerator opening, and when the accelerator opening sensor detects an increase in the accelerator opening, the modulation control unit releases the maintenance.

According to the present invention, a method of controlling a forklift equipped with a variable displacement traveling hydraulic pump driven by an engine, a hydraulic motor that forms a closed circuit with the traveling hydraulic pump therebetween and is driven by hydraulic oil discharged from the traveling hydraulic pump, driving wheels driven by the hydraulic motor, an accelerator operation unit that performs operation for increasing or decreasing an amount of fuel supplied to the engine, and an accelerator opening sensor configured to detect an accelerator opening that is an operation amount of the accelerator operation unit, the method comprises: when calculating a value delayed depending on a setting value of a cut-off frequency or a time constant of the accelerator opening as a corrected accelerator opening and calculating a target maximum absorption torque of the traveling hydraulic pump or a target swash plate tilting angle of a swash plate provided in the traveling hydraulic pump depending on the corrected accelerator opening to control the traveling hydraulic pump, calculating, with reference to a first table on which a first setting value of the cut-off frequency or the time constant according to the corrected accelerator opening, and the target maximum absorption torque of the traveling hydraulic pump, the target swash plate tilting angle of the swash plate or the vehicle speed of the forklift is described, the first setting value by a corrected accelerator opening obtained at a previous control cycle and the target maximum absorption torque of the traveling hydraulic pump or the target swash plate tilting angle, and calculating a corrected accelerator opening of a current control cycle by correcting the accelerator opening detected by the accelerator opening sensor using the obtained first setting value, calculating, with reference to a second table on which a second setting value of the cut-off frequency or the time constant according to the accelerator opening is described, the second setting value by the accelerator opening detected by the accelerator opening sensor and the target maximum absorption torque of the traveling hydraulic pump or the target swash plate tilting angle, and calculating a corrected accelerator opening of a current control cycle by correcting the accelerator opening detected by the accelerator opening sensor using the obtained second setting value, selecting one of the calculations of the first and second setting values to calculate of the current control cycle by correcting the accelerator opening detected by the accelerator opening sensor using corresponding one of the obtained first and second setting values based on an operation amount of the accelerator operation unit, and calculating the target maximum absorption torque or the target swash plate tilting angle depending on the corrected accelerator opening of the current control cycle to control the traveling hydraulic pump.

According to the present invention, a method of controlling a forklift equipped with a variable displacement traveling hydraulic pump driven by an engine, a hydraulic motor that forms a closed circuit with the traveling hydraulic pump therebetween and is driven by hydraulic oil discharged from the traveling hydraulic pump, driving wheels driven by the hydraulic motor, an accelerator operation unit that performs operation for increasing or decreasing an amount of fuel supplied to the engine, and an accelerator opening sensor configured to detect an accelerator opening that is an operation amount of the accelerator operation unit, the method comprises: when calculating a value delayed depending on a setting value of a cut-off frequency or a time constant of the accelerator opening as a corrected accelerator opening and calculating a target maximum absorption torque of the traveling hydraulic pump or a target swash plate tilting angle of a swash plate provided in the traveling hydraulic pump depending on the corrected accelerator opening to control the traveling hydraulic pump, in a case where the accelerator opening detected by the accelerator opening sensor increases, calculating, with reference to a first table on which a first setting value of the cut-off frequency or the time constant according to the corrected accelerator opening, the target maximum absorption torque of the traveling hydraulic pump, the target swash plate tilting angle of the swash plate or a vehicle speed of the forklift is described, the first setting value by a corrected accelerator opening obtained at a previous control cycle and the target maximum absorption torque of the traveling hydraulic pump or the target swash plate tilting angle and calculating a corrected accelerator opening of a current control cycle by correcting the accelerator opening detected by the accelerator opening sensor using the obtained first setting value, in a case where the accelerator opening detected by the accelerator opening sensor decreases, calculating, with reference a second table on which a second setting value of the cut-off frequency and the time constant according to the accelerator opening is described, the second setting value by the accelerator opening detected by the accelerator opening sensor and the target maximum absorption torque of the traveling hydraulic pump or the target swash plate tilting angle, and calculating a corrected accelerator opening of a current control cycle by correcting the accelerator opening detected by the accelerator opening sensor using the obtained second setting value, and calculating the target maximum absorption torque or the target swash plate tilting angle depending on the corrected accelerator opening of the current control cycle to control the traveling hydraulic pump.

According to the present invention, the first setting value of the cut-off frequency or the time constant is determined so that as the target maximum absorption torque, the target swash plate tilting angle or the vehicle speed decreases, responsiveness of the traveling hydraulic pump rises, and the second setting value is determined so that when the accelerator opening increases, as the accelerator opening increases, the responsiveness falls and then rises again.

In the present invention, it is preferable that the first setting value of the cut-off frequency or the time constant is determined, so that as the target maximum absorption torque, the target swash plate tilting angle or the vehicle speed decreases, responsiveness of the traveling hydraulic pump rises, and as the accelerator opening decreases, the responsiveness falls, and the second setting value is determined so that when the accelerator opening increases, as the accelerator opening increases, the responsiveness falls and then rises again.

The invention is able to easily achieve fine positioning operation during low-speed traveling in the forklift equipped with the HST.

BRIEF DESCRIPTION OF DRAWINGS

FIG. 4 is a diagram illustrating a table on which modulation setting values are described and an example of the table.

DESCRIPTION OF EMBODIMENTS

Figure 1:
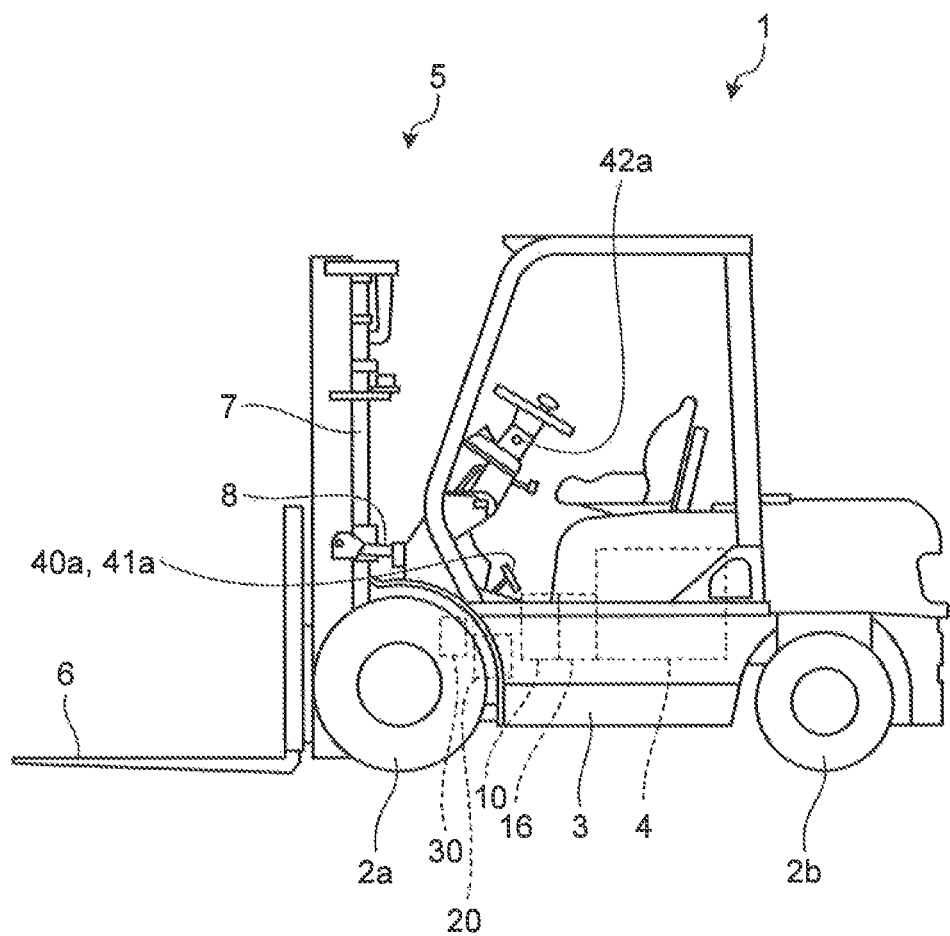
FIG. 1 is a diagram illustrating an overall configuration of a forklift according an embodiment of the invention.

An aspect (embodiment) for carrying out the invention will be described in detail while referring to the drawings.

<Summary of Forklift>

Figure 2:
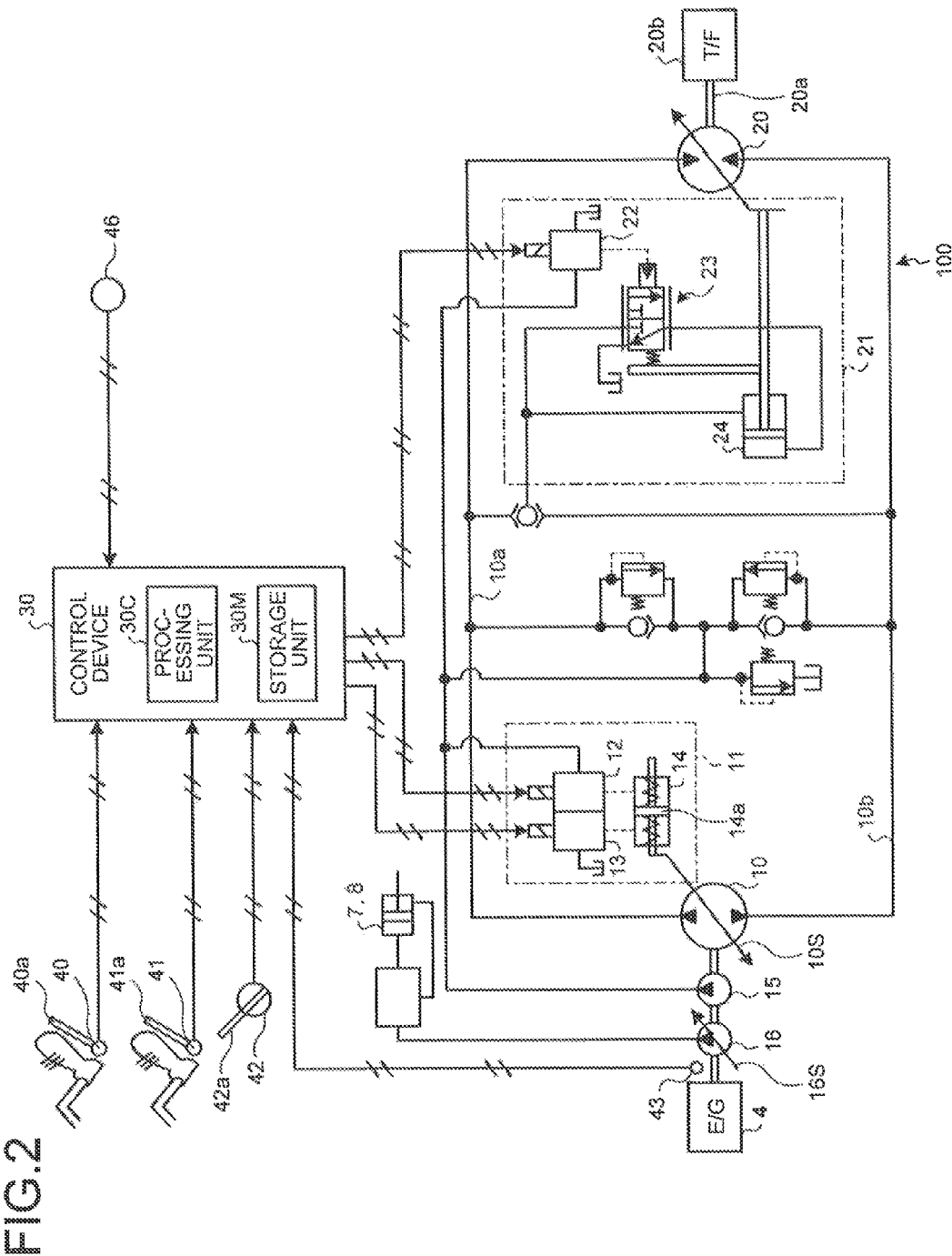
FIG. 2 is a block diagram illustrating a control system of the forklift illustrated in FIG. 1.

FIG. 1 is a diagram illustrating an overall configuration of a forklift according to the embodiment. FIG. 2 is a block diagram illustrating a control system of the forklift illustrated in FIG. 1. A forklift 1 has a vehicle body 3 having driving wheels 2a and steering wheels 2b, and a working machine 5 provided in front of the vehicle body 3. The vehicle body 3 is provided with an engine 4 as an internal combustion engine, a variable displacement traveling hydraulic pump 10 configured to drive the engine 4 as a driving source, and a working machine hydraulic pump 16. The driving wheels 2a are driven by power of the hydraulic motor 20 by allowing the variable displacement traveling hydraulic pump 10 and a variable displacement hydraulic motor 20 to communicate with each other by a closed hydraulic circuit. In this way, the forklift 1 travels by the HST.

The working machine 5 has a lift cylinder 7 configured to raise and lower a fork 6, and a tilt cylinder 8 configured to tilt the fork 6. A driver's seat of the vehicle body 3 is provided with a forward-reverse lever 42a, a brake pedal (an inching pedal) 40a, an accelerator pedal 41a, and a working machine operation lever (not illustrated) including a lift lever and a tilt lever for operating the working machine 5. The brake pedal 40a and the accelerator pedal 41a are provided at a position where an operator of the forklift 1 is capable of performing stepping operation from the driver's seat. In FIG. 1, the brake pedal 40a and the accelerator pedal 41a are drawn in an overlapped state. The accelerator pedal 41a is an accelerator operation unit that performs operation for increasing or decreasing an amount of fuel supplied to the engine 4.

<Hydraulic Circuit>

As illustrated in FIG. 2, the forklift 1 is equipped with the traveling hydraulic pump 10 and the hydraulic motor 20 connected by hydraulic supply lines 10a and 10b of a main hydraulic circuit 100 serving as a closed circuit. The traveling hydraulic pump 10 (hereinafter, appropriately, referred to as an HST pump 10) is a device that is driven by the engine 4 to discharge the hydraulic oil. In this embodiment, the HST pump 10 is, for example, a variable displacement pump that has a swash plate 10S and is capable of changing the capacity by changing a tilting angle (hereinafter, referred to as a swash plate tilting angle) of the swash plate 10S.

The hydraulic motor 20 (hereinafter, appropriately referred to as an HST motor 20) is driven by the hydraulic oil discharged from the HST pump 10. The hydraulic motor 20 is a variable displacement hydraulic motor capable of changing the capacity, for example, by changing the swash plate tilting angle. The HST motor 20 may be a fed displacement hydraulic motor. An output shaft 20a of the HST motor 20 is connected to the driving wheels 2a is a transfer 20b, and the HST motor 20 can drive the forklift 1 by rotationally driving the driving wheels 2a.

The HST motor 20 is capable of switching a rotation direction depending on a supply direction of the hydraulic oil from the HST pump 10. The rotation direction of the HST motor 20 is switched, which can move the forklift 1 forward or backward. In the following description, for convenience, it is assumed that when the hydraulic oil is supplied to the HST motor 20 from the hydraulic supply line 10a, the forklift 1 moves forward, and when the hydraulic oil is supplied to the HST motor 20 from the hydraulic supply line 10b, the forklift 1 moves backward.

The forklift 1 has a pump capacity setting unit 11, a motor capacity setting unit 21, and a charge pump 15. The pump capacity setting unit 11 is provided in the HST pump 10. The pump capacity setting unit 11 includes a forward pump electromagnetic proportional control valve 12, a reverse pump electromagnetic proportional control valve 13, and a pump capacity control cylinder 14. In the pump capacity setting unit 11, a command signal is given to the forward pump electromagnetic proportional control valve 12 and the reverse pump electromagnetic proportional control valve 13 from a control device 30 which will be described below. In the pump capacity setting unit 11, the pump capacity control cylinder 14 is operated according to the command signal given from the control device 30, and the capacity thereof is changed by a change in the swash plate tilting angle of the HST pump 10.

The pump capacity control cylinder 14 is configured so that a piston 14a is held at a neutral position in a state in which the swash plate tilting angle is 0. In this state, the swash plate tilting angle of the HST pump 10 becomes 0. For this reason, even when the engine 4 rotates, an amount of the hydraulic oil discharged to the main hydraulic circuit 100 from the HST pump 10 is zero.

From the state in which the swash plate tilting angle of the HST pump 10 is 0, for example, when a command signal for increasing the capacity of the HST pump 10 is given to the forward pump electromagnetic proportional control valve 12 from the control device 30, the pump control pressure is supplied to the pump capacity control cylinder 14 from the forward pump electromagnetic proportional control valve 12 according to the command signal. As a result, the piston 14a moves to the left side in FIG. 2. When the piston 14a of the pump capacity control cylinder 14 moves to the left side in FIG. 2, the swash plate 10S of the HST pump 10 is tilted toward a direction of discharging the hydraulic oil to the hydraulic supply line 10a in conjunction with this movement.

As the pump control pressure from the forward pump electromagnetic proportional control valve 12 increases, an amount of movement of the piston 14a increases. For this reason, an amount of change in the swash plate tilting angle of the HST pump 10 also increases. That is, when the command signal is given to the forward pump electromagnetic proportional control valve 12 from the control device 30, the pump control pressure according to the command signal is supplied to the pump capacity control cylinder 14 from the forward pump electromagnetic proportional control valve 12. The pump capacity control cylinder 14 is operated by above-described pump control pressure, and thus, the swash plate 10S of the HST pump 10 is tilted so as to be able to discharge a predetermined amount of hydraulic oil to the hydraulic supply line 10a. As a result, if the engine 4 rotates, the hydraulic oil is discharged to the hydraulic supply line 10a from the HST pump 10, and the HST motor 20 rotates in the forward direction.

In the above-described state, when a command signal for reducing the capacity of the HST pump 10 is given to the forward pump electromagnetic proportional control valve 12 from the control device 30, the pump control pressure supplied to the pump capacity control cylinder 14 from the forward pump electromagnetic proportional control valve 12 according to the command signal decreases. For this reason, the piston 14a of the pump capacity control cylinder 14 moves toward the neutral position. As a result, the swash plate tilting angle of the HST pump 10 decreases, and an amount of discharge of the hydraulic oil to the hydraulic supply line 10a from the HST pump 10 decreases.

When the control device 30 gives the command signal for increasing the capacity of the HST pump 10 to the reverse pump electromagnetic proportional control valve 13, the pump control pressure is supplied to the pump capacity control cylinder 14 from the reverse pump electromagnetic proportional control valve 13 depending on the command signal. Then, the piston 14a moves to the right side in FIG. 2. When the piston 14a of the pump capacity control cylinder 14 moves to the right side in FIG. 2, the swash plate 10S of the HST pump 10 is tilted toward a direction of discharging the hydraulic oil to the hydraulic supply line 10b in conjunction with this movement.

As the pump control pressure supplied from the reverse pump electromagnetic proportional control valve 13 increases, an amount of movement of the piston 14a increases. Accordingly, an amount of change in the swash plate tilting angle of the HST pump 10 increases. That is, when the command signal is given to the reverse pump electromagnetic proportional control valve 13 from the control device 30, the pump control pressure depending on the command signal is given to the pump capacity control cylinder 14 from the reverse pump electromagnetic proportional control valve 13. Moreover, the swash plate 10S of the HST pump 10 is tilted so as to be able to discharge a desired amount of hydraulic oil to the hydraulic supply line 10b by the operation of the pump capacity control cylinder 14. As a result, when the engine 4 rotates, the hydraulic oil is discharged to the hydraulic supply line 10b from the HST pump 10, and the HST motor 20 rotates in the reverse direction.

When the command signal for reducing the capacity of the HST pump 10 is given to the reverse pump electromagnetic proportional control valve 13 from the control device 30, the pump control pressure supplied to the pump capacity control cylinder 14 from the reverse pump electromagnetic proportional control valve 13 depending on the command signal decreases, and the piston 14a moves toward the neutral position. As a result, since the swash plate tilting angle of the HST pump 10 decreases, an amount of hydraulic oil discharged to the hydraulic supply line 10b from the HST pump 10 decreases.

The motor capacity setting unit 21 is provided in the HST motor 20. The motor capacity setting unit 21 includes a motor electromagnetic proportional control valve 22, a motor cylinder control valve 23, and a motor capacity control cylinder 24. In the motor capacity setting unit 21, when the command signal is given to the motor electromagnetic proportional control valve 22 from the control device 30, the motor control pressure is supplied to the motor cylinder control valve 23 from the motor electromagnetic proportional control valve 22, and the motor capacity control cylinder 24 is operated. When the motor capacity control cylinder 24 is operated, the swash plate tilting angle of the HST motor 20 changes in conjunction with this operation. For this reason, the capacity of the HST motor 20 is changed depending on a command signal from the control device 30. Specifically, the motor capacity setting unit 21 is configured so that as a motor control pressure supplied from the motor electromagnetic proportional control valve 22 increases, the swash plate tilting angle of the HST motor 20 decreases.

The charge pump 15 is driven by the engine 4. The charge pump 15 supplies the pump control pressure to the pump capacity control cylinder 14 via the forward pump electromagnetic proportional control valve 12 and the reverse pump electromagnetic proportional control valve 13 described above. Furthermore, the charge pump 15 has a function of supplying the motor control pressure to the motor cylinder control valve 23 via the motor electromagnetic proportional control valve 22.

In this embodiment, the engine 4 drives the working machine hydraulic pump 16 in addition to the HST pump 10. The working machine hydraulic pump 16 supplies the hydraulic oil to the lift cylinder 7 and the tilt cylinder 8 serving as working actuators for driving the working machine 5. In this embodiment, the working machine hydraulic pump 16 is a variable displacement pump that has a swash plate 16S and is capable of changing the capacity by changing the swash plate tilting angle of the swash plate 16S.

The forklift 1 includes a brake potentiometer 40, an accelerator potentiometer 41, a forward-reverse lever switch 42, an engine speed sensor 43, and a vehicle speed sensor 46.

When the brake pedal (inching pedal) 40a is operated, the brake potentiometer 40 detects and outputs an operation amount thereof. An operation amount of the brake pedal 40a is a brake opening Bs. The brake opening Bs output from the brake potentiometer 40 is input to the control device 30.

The accelerator potentiometer 41 outputs an operation amount As when the accelerator pedal 41a is operated. The operation amount As of the accelerator pedal 41a is also referred to as an accelerator opening As. The accelerator opening As output from the accelerator potentiometer 41 is input to the control device 30. Since the accelerator potentiometer 41 detects the accelerator opening As, the accelerator potentiometer 41 also functions as an accelerator opening sensor. Opening the accelerator is to increase an amount of fuel supplied to the engine 4 by stepping on the accelerator pedal 41a, and closing the accelerator is to reduce an amount of fuel supplied to the engine 4 by restoring the stepped accelerator pedal 41a.

The forward-reverse lever switch 42 is a selection switch for inputting a direction of progress of the forklift 1. In this embodiment, the forward-reverse lever switch 42 is applied which is capable of selecting three directions of progress of a forward mode, a neutral mode, and a reverse mode by operation of the forward-reverse lever 42a provided at a position capable of being selectively operated from the driver's seat. Information indicating the direction of progress selected by the forward-reverse lever switch 42 is applied to the control device 30 as the selection information.

The engine speed sensor 43 detects an actual engine speed of the engine 4. The engine speed of the engine 4 detected by the engine speed sensor 43 is an actual engine speed Nr. Information indicating the actual engine speed Nr is input to the control device 30. An engine speed of the engine 4 per unit time becomes a au rotational speed of the engine 4. In this embodiment, the actual engine speed Nr includes an actual rotational speed of the engine 4.

The control device 30 includes a processing unit 30C and a storage unit 30M. The control device 30 is, for example, a computer. The processing unit 30C is configured by, for example, a combination of a central processing unit (CPU) and a memory. The processing unit 30C controls the operation of the main hydraulic circuit 100, by reading a computer program for controlling the main hydraulic circuit 100 stored in the storage unit 30M and executing the commands described thereon. The storage unit 30M stores data or the like required for the control of the above-described computer program and the main hydraulic circuit 100. The storage unit 30M is constituted by, for example, read only memory (ROM), a storage device or a combination thereof.

Various sensors such as the brake potentiometer 40, the accelerator potentiometer 41, the forward-reverse lever switch 42, the engine speed sensor 43, and the vehicle speed sensor 46 are electrically connected to the control device 30. Based on the input signals from these various sensors, the control device 30 generates the command signals of the forward pump electromagnetic proportional control valve 12 and the reverse pump electromagnetic proportional control valve 13, and gives the generated command signals to the respective electromagnetic proportional control valves 12, 13, and 22. The control device 30 calculates a target maximum absorption torque of the HST pump 10, based on the accelerator opening As detected by the accelerator potentiometer 41. Moreover, the control device 30 controls the HST pump 10 so that the absorption torque of the HST pump 10 becomes the obtained target maximum absorption torque. In the control of the HST pump 10, the control device 30 changes the swish plate tilting angle of the HST pump 10, for example, by the pump capacity control cylinder 14.

<Control of Traveling Hydraulic Pump 10>

Figure 3:
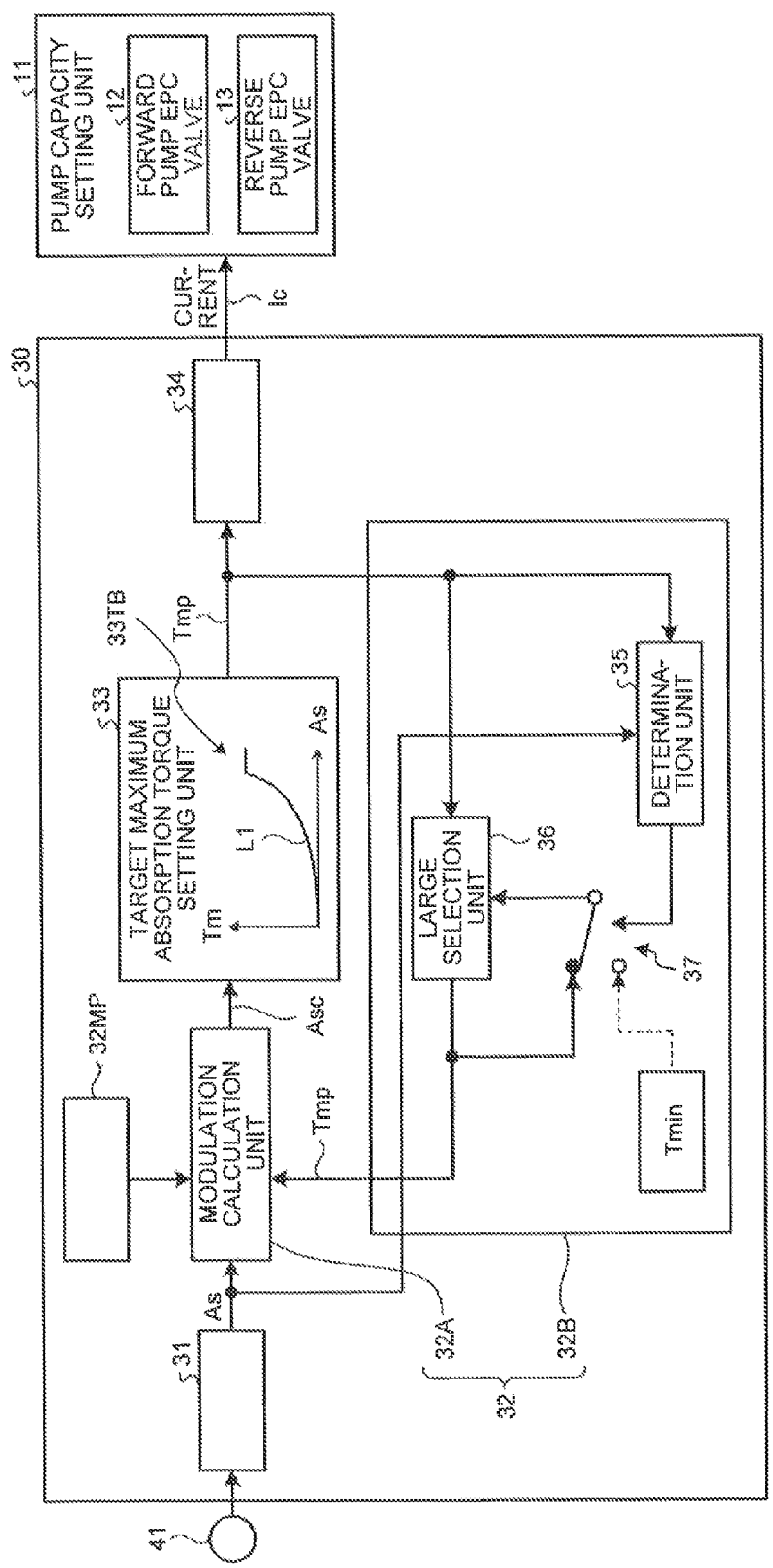
FIG. 3 is a block diagram illustrating a control example of a traveling hydraulic pump of the embodiment executed by a control device.

FIG. 3 is a block diagram illustrating a control example of the traveling hydraulic pump 10 of this embodiment executed by the control device 30. As illustrated in FIG. 3, the control device 30 includes an accelerator opening conversion unit 31, a modulation control unit 32, a target maximum absorption torque setting unit 33, and an HST pump electromagnetic proportional control output current conversion unit 34.

An output unit of the accelerator potentiometer 41 is electrically connected to the accelerator opening conversion unit 31. The accelerator potentiometer 41 detects an opening of the accelerator pedal 41a and outputs the detected opening as a voltage value. The accelerator opening conversion unit 31 converts a voltage value output from the accelerator potentiometer 41 into the accelerator opening As. As the accelerator opening As, for example, a state in which the accelerator pedal 41a is not stepped on is set to 0%, and a state in which the accelerator pedal 41a is completely stepped on is set to 100%.

<Modulation Control Unit 32>

The modulation control unit 32 has a modulation calculation unit 32A and a holding unit 32B. The modulation calculation unit 32A changes responsiveness of the HST pump 10 with respect to the operation amount of the accelerator pedal 41a. For this purpose, the modulation calculation unit 32A calculates a modulation setting value, for example, by giving at least one of the accelerator opening As detected by the accelerator potentiometer 41 and the maximum absorption torque of the HST pump 10 to a table on which a setting value (hereinafter, appropriately referred to as a modulation setting value) calculated in advance depending on the accelerator opening As and the maximum absorption torque of the HST pump 10 is described. Moreover, the modulation calculation unit 32A calculates a corrected accelerator opening Asc by correcting the accelerator opening As detected by the accelerator potentiometer 41 using the obtained setting value. The table on which the modulation setting value is described is stored in a table storage unit 32MP. The table storage unit 32MP is present in the storage unit 30M illustrated in FIG. 2. The corrected accelerator opening Asc obtained at the previous control cycle may be applied to the table on which the modulation setting value is described. In this case, the corrected accelerator opening Asc obtained at the previous control cycle is corrected by the setting value obtained from the above-described table.

(Corrected Accelerator Opening Asc)

On calculating the corrected accelerator opening Asc, the modulation calculation unit 32A sets a cut-off frequency f of the accelerator opening As and outputs a value delayed depending on the cut-off frequency f as a corrected accelerator opening Asc. In this embodiment, delaying the accelerator opening As depending on the set cut-off frequency f is referred to as correction of the accelerator opening As. The cut-off frequency f may be calculated by Formula (1). Symbol τ is a time constant of a primary delay element. As can be seen from Formula (1), the cut-off frequency f is a reciprocal of the time constant τ.

$$f = 1/(2 \times \pi \times \tau) \qquad (1)$$

The input of modulation calculation unit 32A is assumed to be the accelerator opening As, and the output thereof is assumed to be a corrected accelerator opening Asc. When the output with respect to the input to the modulation calculation unit 32A follows a temporary delay, a relation between the accelerator opening As as an input and the corrected accelerator opening Asc as an output is represented in Formula (2). Formula (3) is obtained from Formula (2). Symbol Ascb of Formula (3) represents the corrected accelerator opening Asc that is output from the modulation calculation unit 32A earlier than the corrected accelerator opening Asc as an output of the modulation calculation unit 32A at the present time by a time Δt.

$$Asc + \tau \times dAsc/dt = As \quad (2)$$

$$Asc + (Asc - Ascb) \times \tau/\Delta t = As \quad (3)$$

When solving Formula (3) for the corrected accelerator opening Asc, Formula (4) is obtained. From Formula (4), a corrected accelerator opening Asc is expressed by relations among the accelerator opening As input to the modulation calculation unit 32A at the present time, the corrected accelerator opening Ascb output from the modulation calculation unit 32A earlier than the present time by a time Δt, the time constant τ, and the time Δt. For example, the time Δt can be a time required for one cycle of the control. The corrected accelerator opening Ascb can be a corrected accelerator opening Asc that is output from the modulation calculation unit 32A at the previous control cycle. The time constant τ is set in advance. The accelerator opening As is an accelerator opening As that is output from the accelerator opening conversion unit 31 at the present time. From Formula (1), since when using the cut-off frequency f, the time constant τ=1/(2×π×f) is obtained, when using the cut-off frequency f, Formula (4) becomes Formula (5).

$$Asc = As \times \Delta t/(\Delta t + \tau) + Ascb \times \tau/(\Delta t + \tau) \quad (4)$$

$$Asc = As \times 2 \times \pi \times f \times \Delta t/(2 \times \pi \times f \times \Delta t + 1) + Ascb/(2 \times \pi \times f \times \Delta t + 1) \quad (5)$$

The modulation calculation unit 32A delays the input accelerator opening As and outputs the delayed input accelerator opening As as a corrected accelerator opening Asc. A degree of delay is set by the cut-off frequency f or the time constant τ. In this embodiment, the above-described modulation setting value is the cut-off frequency f or the time constant τ. The degree of delay decreases by increasing the cut-off frequency f (reducing the time constant τ), and the degree of delay increases by reducing the cut-off frequency f (increasing the time constant τ). By changing the degree of delay of the input accelerator opening As, the modulation calculation unit 32A is able to change responsiveness (hereinafter, appropriately referred to as an accelerator responsiveness) of the HST pump 10 with respect to the operation of the accelerator pedal 41a.

(Table on which Modulation Setting Values are Described)

FIG. 4 is a diagram illustrating an example of a table TBi and a table TBd on which the modulation setting values are described. In this embodiment, a table storage unit 32MP stores two kinds of tables TBd and TBi. On both the table TBd and the table TBi, the cut-off frequency f is described as the modulation setting value. The table TBd is used when closing the accelerator, that is, when the accelerator opening As decreases. The table TBi is used when opening the accelerator, that is, when the accelerator opening As increases. Hereinafter, the table TBd is appropriately referred to as a first table TBd, and the table TBi is appropriately referred to as a second table TBi.

When the accelerator opening As detected by the accelerator potentiometer 41 decreases, the modulation calculation unit 32A calculates the modulation setting value, that is, the cut-off frequency f, using the first table TBd. The modulation calculation unit 32A calculates the corrected accelerator opening Asc by using the cut-off frequency f that is calculated using the first table TBd.

When the accelerator opening As detected by the accelerator potentiometer 41 increases, the modulation calculation unit 32A calculates the cut-off frequency f by using the second table TBi. The modulation calculation unit 32A calculates the corrected accelerator opening Asc by using the cut-off frequency f that is calculated using the second table TBi.

As illustrated in FIG. 4, in the first table TBd, the cut-off frequency f is determined based on the corrected accelerator opening Asc and the maximum absorption torque Tm. Numbers of parts surrounded by the corrected accelerator opening Asc and the maximum absorption torque Tm in the first table TBd are the cut-off frequency f. The greater the number attached to the corrected accelerator opening Asc is, the greater the corrected accelerator opening Asc is. In this example, a corrected accelerator opening Asc0 is 0%, and a corrected accelerator opening Asc9 is 100%. The greater the number attached to the maximum absorption torque Tm is, the greater the maximum absorption torque Tm is.

In this embodiment, as the maximum absorption torque Tm decreases, the cut-off frequency f described on the first table TBd increases, and as the corrected accelerator opening Asc decreases, the cut-off frequency f decreases. In addition, in some cases, the cut-off frequency f may become constant irrespective of the corrected accelerator opening Asc, depending on the magnitude of the maximum absorption torque Tm. In this way, the cut-off frequency f determined so that as the maximum absorption torque Tm decreases, a decrease speed of the corrected accelerator opening Asc rises, and as the corrected accelerator opening Asc decreases, the decrease speed of the corrected accelerator opening Asc falls.

As illustrated in FIG. 4, in the second table TBi, the cut-off frequency f is determined based on the accelerator opening As. The greater the number attached to the accelerator opening As is, the greater the accelerator opening As is. In this example, an accelerator opening As0 is 0% and an accelerator opening As7 is 100%. In this embodiment, the cut-off frequency f described on the second table TBi has a part to be decreased in accordance with an increase in the accelerator opening As. That is, from the accelerator opening As0 to the accelerator opening As6, as the accelerator opening As increases, the cut-off frequency f decreases, but the cut-off frequency f of the accelerator opening As7 becomes somewhat greater than the accelerator opening As6. In this way, the cut-off frequency f of the second table TBi is determined so that when the accelerator opening As is less than 100%, as the accelerator opening As increases, responsiveness of the accelerator falls.

(Process Example when Accelerator Opening Decreases)

When the accelerator opening As decreases, the modulation calculation unit 32A obtains a corresponding cut-off frequency f, by giving a corrected accelerator opening Asc output from the modulation calculation unit 32A at the previous control cycle and a maximum absorption torque Tm output from a target maximum absorption torque setting unit 33 to be described later, that is, a target maximum absorption torque Tmp, to the first table TBd illustrated in FIG. 4. For this reason, the modulation calculation unit 32A is configured to be able to maintain the corrected accelerator opening Asc of the previous control cycle until the current control cycle. In this embodiment, the accelerator opening As detected by the accelerator potentiometer 41 at the current control cycle is corrected by the cut-off frequency f calculated from the corrected accelerator opening Asc of the previous control cycle and the target maximum absorption torque Tmp. In this case, the corrected accelerator opening Asc of the previous control cycle may be used, the target maximum absorption torque Tmp may be a value of the previous control cycle or may be a value of the current control cycle. The target maximum absorption torque Tmp of the current control cycle is used in this embodiment. The modulation calculation unit 32A outputs the accelerator opening As which is corrected as the corrected accelerator opening Asc of the current control cycle.

In the first table TBd illustrated in FIG. 4, for example, in the case of a maximum absorption torque Tm5 in a corrected accelerator opening Asc8, the cut-off frequency f is 0.50, and in the case of the maximum absorption torque Tm5 in a corrected accelerator opening Asc6, the cut-off frequency f is 0.30. The modulation calculation unit 32A calculates a corrected accelerator opening Asc, by giving the obtained cut-off frequency f and the accelerator opening As detected by the accelerator potentiometer 41 to the above-described Formula (5). The cut-off frequency f may be calculated using a target swash plate tilting angle or a vehicle speed in place of the target maximum absorption torque Tmp.

(Processing Example when Accelerator Opening Increases)

When the accelerator opening As increases, the modulation calculation unit 32A obtains a corresponding cut-off frequency f, by giving the accelerator opening As detected by the accelerator potentiometer 41 to the second table TBi illustrated in FIG. 4. For example, the cut-off frequency f at the time of the accelerator opening As is 0.20, and the cut-off frequency f at the time of the accelerator opening As2 is 0.30. The modulation calculation unit 32A calculates a corrected accelerator opening Asc, by giving the obtained cut-off frequency f and the accelerator opening As detected by the accelerator potentiometer 41 to the above-described Formula (5).

<Holding Unit 32B>

The holding unit 32B includes a determination unit 35, a large selection unit 36, and a switching unit 37. The accelerator opening As is input to the determination unit 35 from the accelerator opening conversion unit 31, and the target maximum absorption torque Tmp output from a target maximum absorption torque setting unit 33 described later is input to the determination unit 35. The target maximum absorption torque Tmp output from the target maximum absorption torque setting unit 33 described later and the output of the switching unit 37 are input to the large selection unit 36. The switching unit 37 switches the output of the large selection unit 36 and a minimum absorption torque Tmin, as values that are input to the large selection unit 36. The minimum absorption torque Tmin is 0 in this embodiment, but is not limited thereto. With this structure, the determination unit 35 switches the switching unit 37 to the output side or the minimum output side of the large selection unit 36 based on the accelerator opening As.

The holding unit 32B gives the modified target maximum absorption torque Tmp to the modulation calculation unit 32A. Furthermore, the holding unit 32B holds the modified target maximum absorption torque Tmp, which is given to the modulation calculation unit 32A, at a value of the timing when the accelerator potentiometer 41 detects a decrease in the accelerator opening As. Therefore, the determination unit 35 controls the switching unit 37 so that when the accelerator potentiometer 41 detects a decrease in the accelerator opening As, the output of the large selection unit 36 is input to the large selection unit 36. The determination unit 35 may control the switching unit 37 so that when detecting a decrease in the target maximum absorption torque Tmp output from the target maximum absorption torque setting unit 33, the output of the large selection unit 36 is input to the large selection unit 36.

When the output of the large selection unit 36 is input, the large selection unit 36 compares a maximum absorption torque (a target maximum absorption torque Tmp calculated by the target maximum absorption torque setting unit 33 described later) at the timing when the accelerator potentiometer 41 detects a decrease in the accelerator opening As with a maximum absorption torque after that timing. When the accelerator opening As decreases, the target maximum absorption torque Tmp calculated by the target maximum absorption torque setting unit 33 described later decreases than the previous value. When the output of the large selection unit 36 is input to the large selection unit 36 at the timing when the accelerator potentiometer 41 detects a decrease in the accelerator opening As, the output of the large selection unit 36 is maintained at a value of the timing when the accelerator potentiometer 41 detects a decrease in the accelerator opening As.

When the accelerator potentiometer 41 detects an increase in the accelerator opening As, the determination unit 35 controls the switching unit 37 so that a minimum absorption torque Tmin is input to the large selection unit 36. When the minimum absorption torque Tmin is input, the large selection unit 36 compares the target maximum absorption torque Tmp calculated by the target maximum absorption torque setting unit 33 described later with the minimum absorption torque Tmin. Since the minimum absorption torque Tmin is 0, the large selection unit 36 outputs the input value of the large selection unit 36, that is, the target maximum absorption torque Tmp calculated by the target maximum absorption torque setting unit 33 described later. Thus, when the accelerator potentiometer 41 detects an increase in the accelerator opening As, the holding unit 32S releases the maintenance of the value of the maximum absorption torque at the timing of detecting a decrease in the accelerator opening As.

<Target Maximum Absorption Torque Setting Unit 33>

The target maximum absorption torque setting unit 33 calculates a target maximum absorption torque Tmp depending on the corrected accelerator opening Asc that is calculated by the modulation calculation unit 32A. A control cycle at which the modulation calculation unit 32A calculates the corrected accelerator opening Asc is identical to a control cycle at which the target maximum absorption torque setting unit 33 calculates the maximum target absorption torque Tmp using the corrected accelerator opening Asc. For example, the target maximum absorption torque setting unit 33 has a data table 33TB on which a relation as indicated by a characteristic line L1 between the accelerator opening As and the target maximum absorption torque Tmp is described. The relation between the accelerator opening As and the target maximum absorption torque Tmp is determined, for example, so that a fuel consumption rate of the engine 4 illustrated in FIG. 2 is minimized. The target maximum absorption torque setting unit 33 is able to calculate the target maximum absorption torque Tmp corresponding to the corrected accelerator opening Asc, by giving the corrected accelerator opening Asc calculated by the modulation calculation unit 32A to the data table 33TB. The target maximum absorption torque setting unit 33 outputs the calculated target maximum absorption torque Tmp to the HST pump electromagnetic proportional control output current conversion unit 34.

The HST pump electromagnetic proportional control output current conversion unit 34 as an output control unit generates a target absorption torque command Ic based on the target maximum absorption torque Tmp and outputs the command to the pump capacity setting unit 11 of the HST pump 10. In response to the target absorption torque command Ic, the pump capacity setting unit 11 controls the swash plate tilting angle of the HST pump 10 so that torque absorbed by the HST pump 10 becomes a target maximum absorption torque Tmp.

The target absorption torque command Ic is a signal (a current value in this embodiment) for setting the torque absorbed by the HST pump 10 to the target maximum absorption torque Tmp. The target absorption torque command Ic is output to the forward pump electromagnetic proportional control valve 12 or the reverse pump electromagnetic proportional control valve 13 of the pump capacity setting unit 11 from the HST pump electromagnetic proportional control output current conversion unit 34. Next, a control example of the HST pump 10 according to this embodiment will be described.

<Control Example of HST Pump 10>

Figure 5:
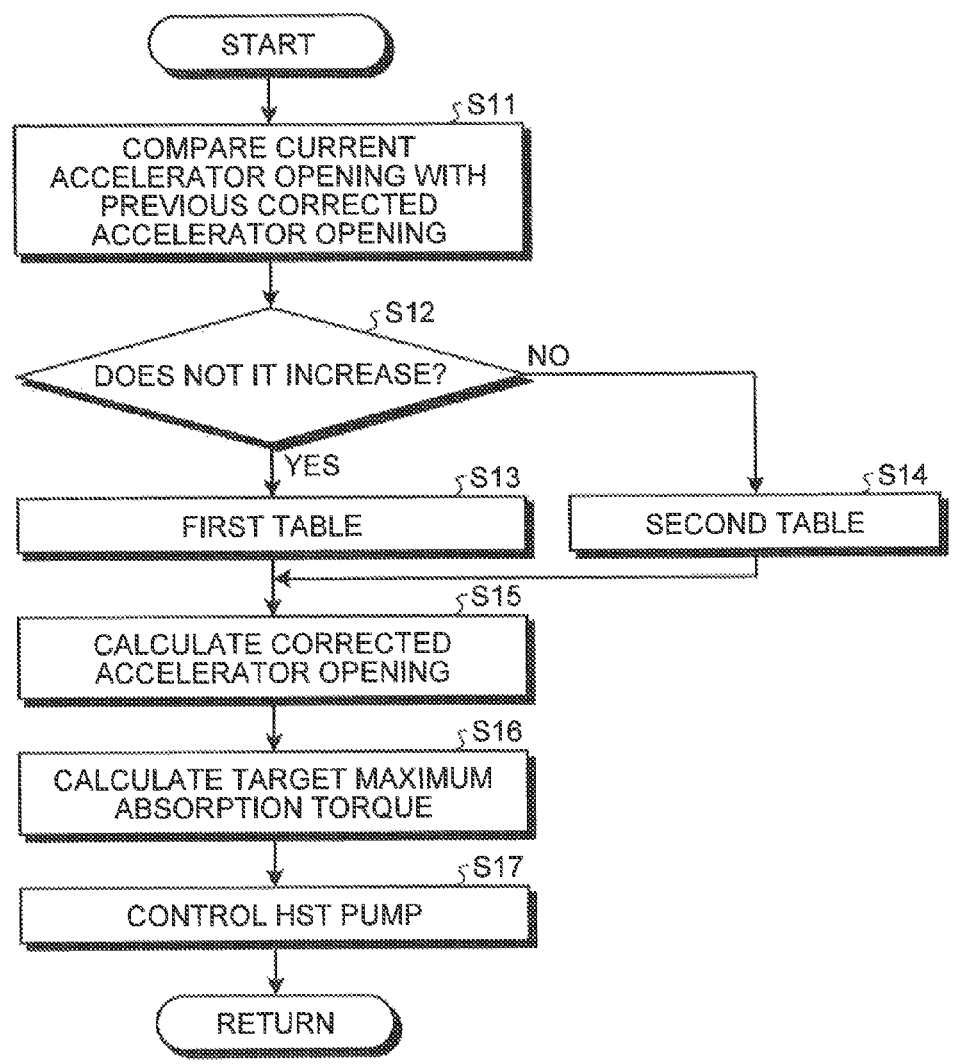
FIG. 5 is a flowchart illustrating a control example of an HST pump executed by the control device equipped in the forklift.

FIG. 5 is a flowchart illustrating a control example of the HST pump 10 executed by the control device 30 equipped in the forklift 1. On controlling the HST pump 10, the control device 30 illustrated in FIG. 3 repeats a series of processes from Step S11 to Step S17 of the flowchart illustrated in FIG. 5 at a predetermined cycle (for example, a time Δt). The above-described series of processes is appropriately referred to as one cycle of the control.

On controlling the HST pump 10, the modulation control unit 32 of the control device 30 (the modulation calculation unit 32A in this control example) acquires the accelerator opening As from the accelerator potentiometer 41 and the accelerator opening conversion unit 31. Moreover, in Step S11, the modulation calculation unit 32A compares the accelerator opening As acquired at the current control with the corrected accelerator opening Asc at the previous control, that is, at the control before one cycle.

In Step S12, when the accelerator opening As is equal to or smaller than the corrected accelerator opening Asc (As≤Asc), the modulation calculation unit 32A determines that the accelerator opening does not increase, that is, the accelerator pedal 41a is closed or held (Yes in Step S12). In this case, in Step S13, in order to calculate a corrected accelerator opening Asc, the modulation calculation unit 32A selects the first table TBd illustrated in FIG. 4.

In Step S12, when the accelerator opening As is greater than the corrected accelerator opening Asc (As>Asc), the modulation calculation unit 32A determines that accelerator opening increases, that is, the accelerator pedal 41a is stepped on (No in Step S12). In this case, in Step S14, in order to calculate a corrected accelerator opening Asc, the modulation calculation unit 32A selects the second table TBi illustrated in FIG. 4.

If a table for calculating the corrected accelerator opening Asc, the process proceeds to Step S15. If the accelerator pedal 41a is closed or held, the first table TBd is selected. The modulation calculation unit 32A gives the corrected accelerator opening Asc of the previous control cycle and the maximum absorption torque input from the large selection unit 36 illustrated in FIG. 3 to the first table TBd. As long as the output of the large selection unit 36 is input to the large selection unit 36 from the switching unit 37 illustrated in FIG. 3, that is, as long as the accelerator pedal 41a is closed or being closed, the target maximum absorption torque Tmp, which is output from the target maximum absorption torque setting unit 33 at the timing when the accelerator potentiometer 41 detects a decrease in the accelerator opening As, is output from the large selection unit 36. For this reason, when the accelerator pedal 41a is closed or held, the maximum absorption torque applied to the first table TBd becomes a target maximum absorption torque Tmp that is output from the target maximum absorption torque setting unit 33 at the timing when the accelerator potentiometer 41 detects a decrease in the accelerator opening As.

The modulation calculation unit 32A acquires the corrected accelerator opening Asc given thereto and the cut-off frequency f corresponding to the maximum absorption torque from the first table TBd. Moreover, the modulation calculation unit 32A calculates the corrected accelerator opening Asc corresponding to a state in which the accelerator pedal 41a is closed or being closed, using the acquired cut-off frequency f.

When the accelerator pedal 41a is stepped on, the second table TBi is selected. The modulation calculation unit 32A gives the accelerator opening As of the current control to the second table TBi. Since the accelerator pedal 41a is stepped on, the determination unit 35 of the holding unit 32B illustrated in FIG. 3 switches the switching unit 37 so that the minimum absorption torque Tmin is input to the large selection unit 36.

The modulation calculation unit 32A acquires the cut-off frequency f corresponding to the accelerator opening As given thereto from the second table TBi. Moreover, the modulation calculation unit 32A calculates the corrected accelerator opening Asc corresponding to the state in which the accelerator pedal 41a is stepped on using the acquired cut-off frequency f.

If the corrected accelerator opening Asc is calculated, the process proceeds to Step S16. In Step S16, the target maximum absorption torque setting unit 33 of the control device 30 illustrated in FIG. 3 gives the corrected accelerator opening Asc calculated by the modulation calculation unit 32A to the data table 33TB, calculates the corresponding target maximum absorption torque Tmp, and then outputs the target maximum absorption torque Tmp to the HST pump electromagnetic proportional control output current conversion unit 34 illustrated in FIG. 3.

Next, the process proceeds to Step S17, and the HST pump electromagnetic proportional control output current conversion unit 34 generates a target absorption torque command Ic based on the target maximum absorption torque Tmp input from the target maximum absorption torque setting unit 33 and outputs the command to the pump capacity setting unit 11 of the HST pump 10. The pump capacity setting unit 11 controls the swish plate tilting angle of the HST pump 10 so that torque absorbed by the HST pump 10 becomes a target maximum absorption torque Tmp based on the input target absorption torque command Ic.

By executing Step S11 to Step S17 by the control device 30, one cycle of control terminates. If one cycle of the control terminates, the control device 30 returns to Step S11 and executes the control of next cycle.

At the moment of releasing the accelerator pedal 41a, when the maximum absorption torque Tm given to the first table TBd is relatively small, that is, when the vehicle speed is relatively low, the control device 30 is able to increase the change speed (the decrease speed in this case) of the target maximum absorption torque Tmp by the above-described control. For this reason, in the forklift 1, the degree of deceleration is strengthened until the accelerator pedal 41a stops from being released. That is, after the accelerator pedal 41a is released, deceleration force rapidly increases. As a result, an operator is able to easily achieve positioning of the forklift 1 only by the operation of the accelerator pedal 41a. In particular, since the forklift 1 equipped with the HST cannot perform creep traveling, the slight movement is difficult. However, according to this embodiment, even when there is a need for positioning by the slight movement of several centimeters during low-speed traveling, the operator is able to easily achieve positioning.

In this embodiment, as described above, at the moment when the operator releases the accelerator pedal 41a, the maximum absorption torque Tm given to the first table TBd is maintained at a target maximum absorption torque Tmp of the above-described timing. The moment when the operator releases the accelerator pedal 41a is the timing when the accelerator opening As decreases or the timing when the absorption torque of the HST pump 10 begins to decrease.

The modulation calculation unit 32A determines the cut-off frequency f based on the corrected accelerator opening Asc of the previous control cycle under the maintained target maximum absorption torque Tmp. In the first table TBd, if the maximum absorption torque Tm is constant, when the corrected accelerator opening Asc decreases, the cut-off frequency f decreases. Furthermore, as the maximum absorption torque increases, the cut-off frequency f decreases. Furthermore, when the cut-off frequency f is small, the change speed of the target maximum absorption torque Tmp decreases.

At the moment of releasing the accelerator pedal 41a, when the maximum absorption torque Tm given to the first table TBd is relatively large, that is, when the vehicle speed is relatively high, the control device 30 is able to reduce the change speed (the decrease speed in this case) of the target maximum absorption torque Tmp by the above-described control. As a result, since the degree of deceleration weakens until the forklift 1 stops, it is possible to reduce a possibility of load collapse. In addition, since a sudden increase in the deceleration of the forklift 1 is suppressed just before the stop, it is possible to reduce discomfort felt by the operator. Furthermore, the forklift 1 is equipped with the HST, but the control of the HST pump 10 according to this embodiment is performed, and thus, there is an advantage that even operators accustomed to the operation of a forklift equipped with a torque converter feel little discomfort.

In the above description, it was assumed that the target maximum absorption torque setting unit 33 calculated the target maximum absorption torque Tmp. However, the term "target maximum absorption torque" is only one concept, and can also be expressed as, for example, a target swash plate tilting angle. The target swash plate tilting angle is a targeted tilting angle of the swash plate 10S included in the HST pump 10 illustrated in FIG. 2.

<Modified Example of Control when Stepping on Accelerator Pedal 41a>

Figure 6:
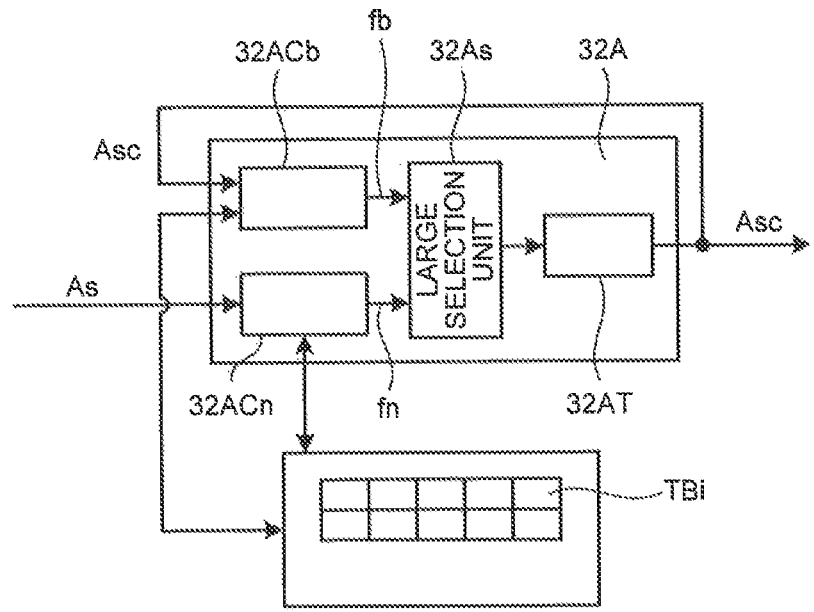
FIG. 6 is a block diagram illustrating control according to a modified example.
Figure 7:
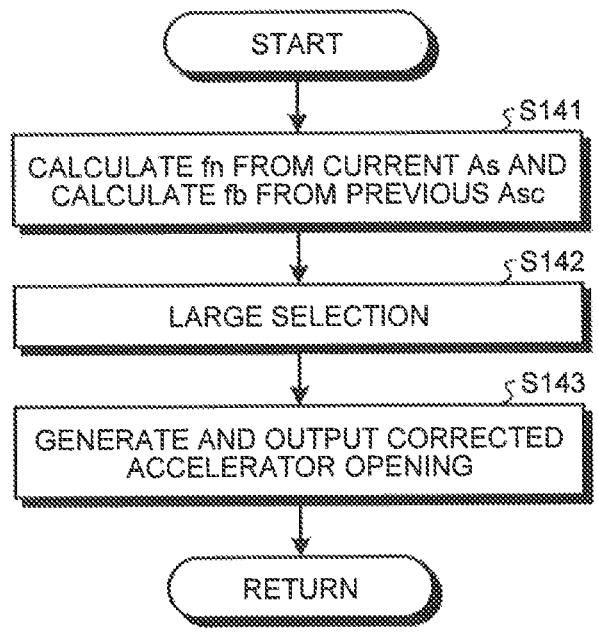
FIG. 7 is a flowchart of the control according to the modified example.

FIG. 6 is a block diagram for describing the control according to this modified example. FIG. 7 is a flowchart of control according to this modified example. This modified example is an example in which when the operator of the forklift 1 illustrated in FIG. 1 steps on the accelerator pedal 41a illustrated in FIG. 2, slowness of acceleration in the intermediate degree of the opening of the accelerator pedal 41a is suppressed.

Therefore, when the accelerator opening As detected by the accelerator potentiometer 41 increases, the modulation calculation unit 32A illustrated in FIG. 6 calculates a first cut-off frequency fn that is calculated by giving the accelerator opening As to the second table TBi illustrated in FIGS. 6 and 4. Furthermore, the modulation calculation unit 32A calculates a second cut-off frequency fb that is calculated by giving the corrected accelerator opening Asc, which is calculated at the timing before calculating the first cut-off frequency fn, to the second table TBi. In this modified example, the timing before calculating the first cut-off frequency fn is control before one cycle of the cycle during which the first cut-off frequency fn is calculated. The modulation calculation unit 32A corrects the accelerator opening As detected by the accelerator potentiometer 41 to calculate the corrected accelerator opening Asc using the larger frequency between the first cut-off frequency fn and the second cut-off frequency fb.

The modulation calculation unit 32A includes a first setting value generation unit 32ACn, a second setting value generation unit 32ACb, a large selection unit 32As, and a corrected accelerator opening generation unit 32AT. The detected value of the accelerator potentiometer 41 is input to the first setting value generation unit 32ACn via the accelerator opening conversion unit 31. That is, the accelerator opening As is input to the first setting value generation unit 32ACn. In Step S141 illustrated in FIG. 7, the first setting value generation unit 32ACn acquires the corresponding first cut-off frequency fn by giving the input accelerator opening As to the second table TBi, and outputs the first cut-off frequency fn to the large selection unit 32As.

The output of the modulation calculation unit 32A is input to the second setting value generation unit 32ACb. That is, the corrected accelerator opening Asc at the previous control cycle is input to the second setting value generation unit 32ACb. In Step S141, the second setting value generation unit 32ACb acquires a corresponding second cut-off frequency fb by giving the input corrected accelerator opening Asc to the second table TBi, and outputs the second cut-off frequency fb to the large selection unit 32As.

In Step S142, the large selection unit 32As compares the input first cut-off frequency fn with the second cut-off frequency fb, and outputs the larger frequency. In Step S143, the corrected accelerator opening generation unit 32AT generates and outputs the corrected accelerator opening Asc at the current control cycle, by giving the value input from the large selection unit 32As and the accelerator opening As from the accelerator potentiometer 41 to the above-described Formula (5).

As illustrated in FIG. 4, in the second table TBi, as the accelerator opening As increases, the cut-off frequency fs decreases from a higher state, and the cut-off frequency f becomes a minimum value in the intermediate level of accelerator opening As. Thereafter, the cut-off frequency increases with an increase in the accelerator opening As. In this embodiment, in the second table TBi, when the accelerator opening As is minimum (As0) and when the accelerator opening As is maximum (As7), the cut-off frequency f is highest. Therefore, the second table TBi is determined so that when the accelerator opening As increases, as the accelerator opening As increases, the accelerator responsiveness decreases, and then the accelerator responsiveness rises again.

In this embodiment, in the second table TBi, the cut-off frequency f decreases with an increase in the accelerator opening As. Therefore, when the operator attempts to start by stepping on the accelerator pedal 41a to an intermediate degree, the cut-off frequency f decreases depending on the accelerator opening As, and thus, the chance speed of the target maximum absorption torque Tmp also decreases. As a result, the operator may feel slowness when the forklift 1 starts.

This modified example determines the cut-off frequency f using the second table TBi, but the larger cut-off frequency of the second cut-off frequency fb determined by the corrected accelerator opening Asc of the previous control cycle and the first cut-off frequency fn determined by the accelerator opening As of the current control cycle may be used. The corrected accelerator opening Asc changes according to a temporary delay of the accelerator opening As. Therefore, when the accelerator pedal 41*a* is stepped on, the corrected accelerator opening Asc of the previous control cycle is smaller than the accelerator opening As of the current control cycle. When the forklift 1 accelerates by stepping on the accelerator pedal 41*a*, since the accelerator opening As increases with the passage of time, the second cut-off frequency fb is greater than the first cut-off frequency fn.

For example, when the accelerator opening at the current control cycle is As4, the cut-off frequency f is 0.20 according to the second table TBi illustrated in FIG. 4. When the corrected accelerator opening at the previous control cycle is assumed to be a value of As1, the cut-off frequency f calculated from the corrected accelerator opening Asc is 3.00. In this modified example, at the current control cycle, since the corrected accelerator opening Asc is generated using the greater one of the two cut-off frequencies f, the cut-off frequency f of 3.00 is selected. Since the change speed of the target maximum absorption torque Tmp is maintained in a large state by using the cut-off frequency f, the forklift 1 quickly starts.

After the forklift 1 starts, when the corrected accelerator opening Asc rises to a value of As2, the cut-off frequency f calculated from the corrected accelerator opening Asc becomes 0.30. Even if the larger cut-off frequency f is selected after being compared to 0.20 of the cut-off frequency f calculated from the accelerator opening As at the current control cycle, the cut-off frequency f is a small value of 0.30. Since the change speed of the target maximum absorption torque Tmp decreases by using this cut-off frequency f, unnecessary sudden start after the start of the forklift 1 is suppressed. Furthermore, when stepping on the accelerator pedal 41*a* illustrated in FIG. 2 until the accelerator opening As is maximized, since the larger cut-off frequency f of 20 is selected, the forklift 1 can immediately start and accelerate as intended by the operator.

In this way, since the corrected accelerator opening generation unit 32AT generates a corrected accelerator opening Asc using the larger cut-off frequency f selected by the large selection unit 32As, a decrease in the change speed of the target maximum absorption torque Tmp is suppressed. As a result, slowness of the start of the forklift 1 felt by the operator is reduced. Furthermore, since the cut-off frequency f becomes a small value after the forklift 1 starts, unnecessary sudden start of the forklift 1 after the start is suppressed. When the accelerator opening As is small, since the cut-off frequency f of the second table TBi is a relatively large value, it is possible to secure responsiveness to the operation of the accelerator pedal 41*a* when the forklift 1 moves at a very slow speed. Furthermore, when stepping on the accelerator pedal 41*a* until the accelerator opening As is maximized, the forklift 1 can immediately start and accelerate as intended by the operator.

<Modified Example of Control of HST Pump 10 Using Control Device 30>

Figure 8:
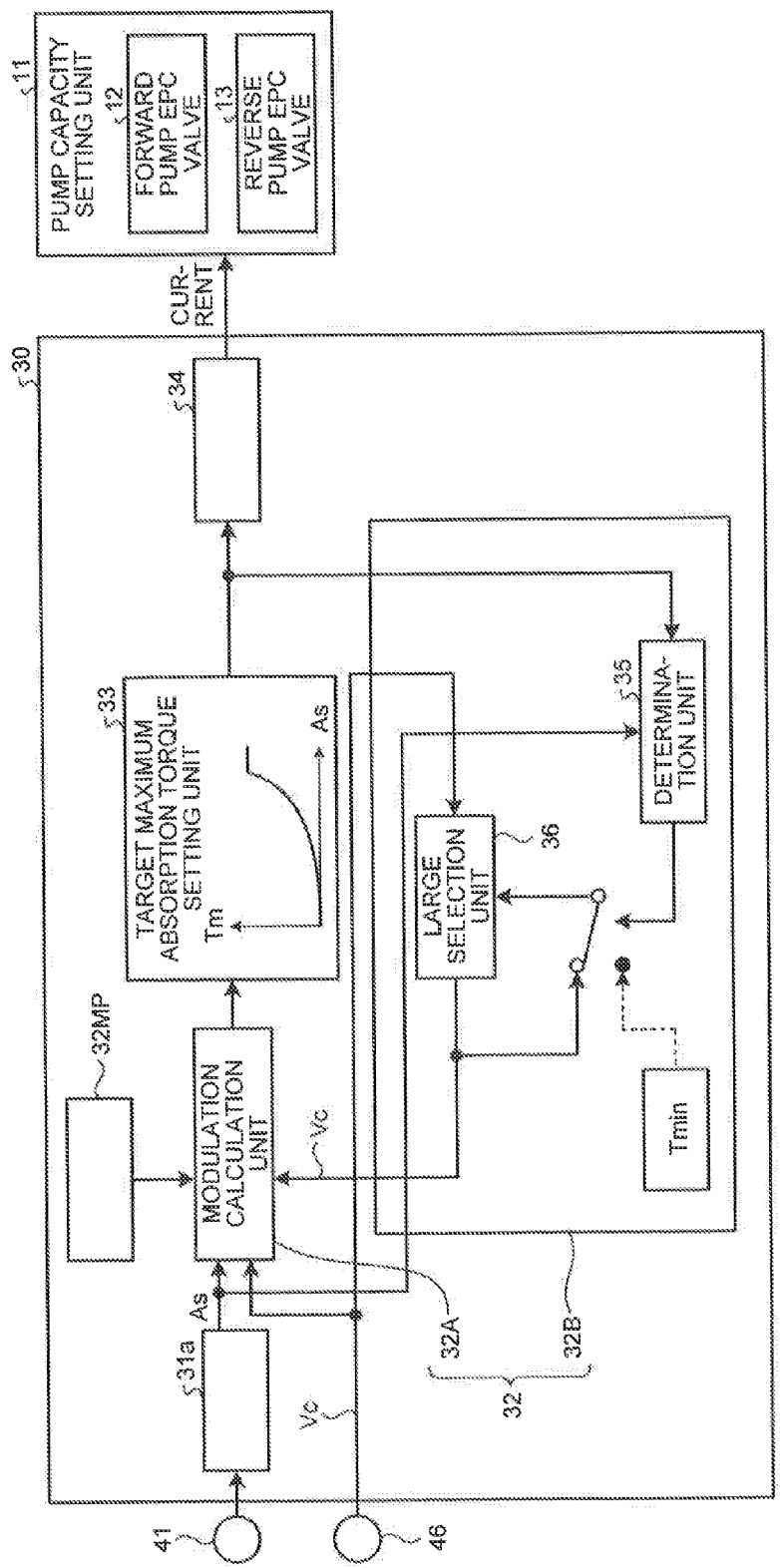
FIG. 8 is a diagram illustrating a modified example of the control of the HST pump using the control device.

FIG. 8 is a diagram illustrating a modified example of the control of the HST pump 10 using the control device 30. In the above-described embodiment, the cut-off frequency f has been determined depending on the maximum absorption torque Tm and the accelerator opening As, but a vehicle speed Vc of the forklift 1 may be used instead of the maximum absorption torque Tm. Usually, this is because there is a proportional relation between the maximum absorption torque Tm and the vehicle speed Vc. In this case, in the first table TBd illustrated in FIG. 4, the cut-off frequency f is determined depending on the vehicle speed Vc of the forklift 1 instead of the maximum absorption torque Tm. In this modified example, as the vehicle seed Vc decreases, the cut-off frequency f increases. That is, the cut-off frequency f is set so that as the vehicle speed Vc decreases, the accelerator responsiveness rises.

When using the vehicle speed Vc, as illustrated in FIG. 8, the vehicle speed Vc of the forklift 1 detected by the vehicle speed sensor 46 is input to the modulation calculation unit 32A and the large selection unit 36. Furthermore, the accelerator opening As from the accelerator potentiometer 41 is input to a determination unit 35*a* via accelerator opening conversion unit 31*a*. Other configurations are the same as those in the case of using the maximum absorption torque Tm.

A first table TBd of the maximum absorption torque Tm and a first table TBd of the vehicle speed Vc are prepared, and the control device 30 calculates the corrected accelerator opening Asc using any one first table TBd. For example, when the maximum absorption torque Tm or the vehicle speed Vc cannot be obtained for some reason, such as a disconnection of cab signal lines of the forklift 1, the control device 30 may calculate the corrected accelerator opening Asc using the normally obtained information. In this way, the reliability is improved.

As described above, the forklift 1 and the control device 30 thereof calculate the target maximum absorption torque Tmp of the HST pump 10, using the cut-off frequency f which is determined in advance depending on a change in the accelerator opening As and the maximum absorption torque Tm of the HST pump 10 or the vehicle speed Vc of the forklift 1. In this way, only in a case where the forklift 1 is traveling at low speed ranges, the forklift 1 and the control device 30 can strengthen the deceleration force when the operator releases the accelerator pedal 41*a* and can allow positioning only by the operation of the accelerator pedal 41*a*. Furthermore, when the traveling speed of the forklift 1 is relatively high, since the forklift 1 and the control device 30 can relatively reduce the cut-off frequency f, it is possible to reduce the change speed of the target maximum absorption torque Tmp. As a result, since it is possible to weaken a degree of deceleration until the forklift 1 stops, it is possible to reduce the possibility of load collapse. Furthermore, since a sudden increase of deceleration of the forklift 1 just before the stop is suppressed, it is possible to reduce discomfort felt by the operator.

The embodiment has been described hereinabove, the embodiment is not intended to be limited by the above-described contents. Furthermore, the above-described components include ones capable of easily assumed by persons skilled in the art, substantially the same ones, and so-called ones of equivalent range. In addition, the above-described components can be appropriately combined with one another. Furthermore, it is possible to perform at least one of various omissions, substitutions, and modifications of components without departing from the scope of this embodiment.

REFERENCE SIGNS LIST

1 FORKLIFT
2*a* DRIVING WHEELS

4 ENGINE
5 WORKING MACHINE
6 FORK
10 TRAVELING HYDRAULIC PUMP (HST PUMP)
11 PUMP CAPACITY SETTING UNIT
12 FORWARD PUMP ELECTROMAGNETIC PROPORTIONAL CONTROL VALVE
13 REVERSE PUMP ELECTROMAGNETIC PROPORTIONAL CONTROL VALVE
14 PUMP CAPACITY CONTROL CYLINDER
20 HYDRAULIC MOTOR (HST MOTOR)
30 CONTROL DEVICE
31 ACCELERATOR OPENING CONVERSION UNIT
32 MODULATION CONTROL UNIT
32A MODULATION CALCULATION UNIT
32B HOLDING UNIT
32MP TABLE STORAGE UNIT
33 TARGET MAXIMUM ABSORPTION TORQUE SETTING UNIT
34 HST PUMP ELECTROMAGNETIC PROPORTIONAL CONTROL OUTPUT CURRENT CONVERSION UNIT
35 DETERMINATION UNIT
36 LARGE SELECTION UNIT
37 SWITCHING UNIT
40 BRAKE POTENTIOMETER
40a BRAKE PEDAL
41 ACCELERATOR POTENTIOMETER
41a ACCELERATOR PEDAL
46 VEHICLE SPEED SENSOR
100 MAIN HYDRAULIC CIRCUIT
As ACCELERATOR OPENING
Asc, Ascb CORRECTED ACCELERATOR OPENING
f CUT-OFF FREQUENCY
Tmp TARGET MAXIMUM ABSORPTION TORQUE
τ TIME CONSTANT

The invention claimed is:

1. A forklift equipped with a variable displacement traveling hydraulic pump driven by an engine, a hydraulic motor that forms a closed circuit with the traveling hydraulic pump therebetween and is driven by hydraulic oil discharged from the traveling hydraulic pump, and driving wheels driven by the hydraulic motor, the forklift comprising:

an accelerator operation unit that performs operation for increasing or decreasing an amount of fuel supplied to the engine;
an accelerator opening sensor that detects an accelerator opening which is an operation amount of the accelerator operation unit; and
a control device that has a modulation control unit configured to calculate a value delayed depending on a setting value of a cut-off frequency or a time constant of the accelerator opening as a corrected accelerator opening, and a target maximum absorption torque setting unit configured to calculate a target maximum absorption torque of the traveling hydraulic pump or a target swash plate tilting angle of a swash plate provided in the traveling hydraulic pump depending on the corrected accelerator opening, and controls the traveling hydraulic pump,
wherein the modulation control unit calculates, with reference to a table on which the setting value of the cut-off frequency or the time constant according to at least the corrected accelerator opening is described, the setting value by a corrected accelerator opening obtained at a previous control cycle, and calculates a corrected accelerator opening of a current control cycle by correcting the accelerator opening detected by the accelerator opening sensor using the obtained setting value, and the target maximum absorption torque setting unit calculates the target maximum absorption torque or the target swash plate tilting angle depending on the corrected accelerator opening of the current control cycle.

2. The forklift equipped with a variable displacement traveling hydraulic pump driven by an engine according to claim 1,
wherein the modulation control unit calculates, with reference to a table on which the setting value of the cut-off frequency or the time constant according to the corrected accelerator opening, and the target maximum absorption torque of the traveling hydraulic pump, the target swash plate tilting angle of the swash plate, or a vehicle speed of the forklift is described, the setting value by a corrected accelerator opening obtained at a previous control cycle and the target maximum absorption torque of the traveling hydraulic pump or the target swash plate tilting angle, and calculates a corrected accelerator opening of a current control cycle by correcting the accelerator opening detected by the accelerator opening sensor using the obtained setting value.

3. The forklift equipped with a variable displacement traveling hydraulic pump driven by an engine according to claim 1,
wherein when the accelerator opening detected by the accelerator opening sensor decreases, the modulation control unit calculates, with reference to a table on which the setting value of the cut-off frequency or the time constant is described, the setting value being set in advance depending on the corrected accelerator opening, and the target maximum absorption torque of the traveling hydraulic pump, the target swash plate tilting angle of the swash plate provided in the traveling hydraulic pump or a vehicle speed of the forklift, the setting value by a corrected accelerator opening obtained at a previous control cycle, and a target maximum absorption torque of the traveling hydraulic pump or the target swash plate tilting angle, and the modulation control unit calculates a corrected accelerator opening of a current control cycle by correcting the accelerator opening detected by the accelerator opening sensor using the obtained setting value.

4. The forklift according to claim 3,
wherein the setting value of the cut-off frequency or the time constant is determined so that as the target maximum absorption torque, the target swash plate tilting angle or the vehicle speed decreases, responsiveness of the traveling hydraulic pump rises.

5. The forklift according to claim 3,
wherein the setting value of the cut-off frequency or the time constant is determined so that as the target maximum absorption torque, the target swash plate tilting angle or the vehicle speed decreases, responsiveness of the traveling hydraulic pump rises, and as the accelerator opening decreases, the responsiveness falls.

6. The forklift according to claim 3,
wherein the modulation control unit maintains the target maximum absorption torque or the target swash plate tilting angle used when referring to the table at a value of a timing at which the accelerator opening sensor detects a decrease in the accelerator opening, and
when the accelerator opening sensor detects an increase in the accelerator opening, the modulation control unit releases the maintenance.

7. The forklift equipped with a variable displacement traveling hydraulic pump driven by an engine according to claim 1,
wherein the modulation control unit calculates, with reference to a first table on which a first setting value of the cut-off frequency or the time constant according to the corrected accelerator opening, and the target maximum absorption torque of the traveling hydraulic pump, the target swash plate tilting angle of the swash plate or a vehicle speed of the forklift is described, a first setting value by a corrected accelerator opening obtained at a previous control cycle and the target maximum absorption torque or the target swash plate tilting angle of the traveling hydraulic pump, and calculates a corrected accelerator opening of a current control cycle by correcting the accelerator opening detected by the accelerator opening sensor using the obtained first setting value,
the modulation control unit calculates, with reference to a second table on which a second setting value of the cut-off frequency or the time constant according to the accelerator opening is described, a second setting value by the accelerator opening detected by the accelerator opening sensor and the target maximum absorption torque of the traveling hydraulic pump or the target swash plate tilting angle, and calculates a corrected accelerator opening of a current control cycle by correcting the accelerator opening detected by the accelerator opening sensor using the obtained second setting value,
the modulation control unit selects one of the calculations of the first and second setting values to calculate the corrected accelerator opening of the current control cycle by correcting the accelerator opening detected by the accelerator opening sensor using corresponding one of the obtained first and second setting values based on an operation amount of the accelerator operation unit.

8. The forklift equipped with a variable displacement traveling hydraulic pump driven by an engine according to claim 1,
wherein when the accelerator opening detected by the accelerator opening sensor increases, the modulation control unit calculates, with reference to a first table on which a first setting value of the cut-off frequency or the time constant according to the accelerator opening, the target maximum absorption torque of the traveling hydraulic pump, the target swash plate tilting angle of the swash plate or a vehicle speed of the forklift is described, the first setting value by a corrected accelerator opening obtained at a previous control cycle and the target maximum absorption torque of the traveling hydraulic pump or the target swash plate tilting angle and calculates a corrected accelerator opening of a current control cycle by correcting the accelerator opening detected by the accelerator opening sensor using the obtained first setting value,
when the accelerator opening detected by the accelerator opening sensor decreases, the modulation control unit calculates, with reference to a second table on which a second setting value of the cut-off frequency or the time constant according to the accelerator opening is described, the second setting value by the accelerator opening detected by the accelerator opening sensor and the target maximum absorption torque of the traveling hydraulic pump or the target swash plate tilting angle and calculates a corrected accelerator opening of a current control cycle by correcting the accelerator opening detected by the accelerator opening sensor using the obtained second setting value.

9. The forklift according to claim 8,
wherein the first setting value of the cut-off frequency or the time constant is determined so that as the target maximum absorption torque, the target swash plate tilting angle or the vehicle speed decreases, responsiveness of the traveling hydraulic pump rises, and
when the second setting value is determined so that when the accelerator opening increases, as the accelerator opening increases, the responsiveness falls and then rises again.

10. The forklift according to claim 8,
wherein the first setting value of the cut-off frequency or the time constant is determined so that as the target maximum absorption torque, the target swash plate tilting angle or the vehicle speed decreases, responsiveness of the traveling hydraulic pump rises, and as the accelerator opening decreases, the responsiveness falls, and
the second setting value is determined so that when the accelerator opening increases, as the accelerator opening increases, the responsiveness falls and then rises again.

11. A method of controlling a forklift equipped with a variable displacement traveling hydraulic pump driven by an engine, a hydraulic motor that forms a closed circuit with the traveling hydraulic pump therebetween and is driven by hydraulic oil discharged from the traveling hydraulic pump, driving wheels driven by the hydraulic motor, an accelerator operation unit that performs operation for increasing or decreasing an amount of fuel supplied to the engine, and an accelerator opening sensor configured to detect an accelerator opening that is an operation amount of the accelerator operation unit, the method comprising the steps of:
calculating a value delayed depending on a setting value of a cut-off frequency or a time constant of the accelerator opening as a corrected accelerator opening and calculating a target maximum absorption torque of the traveling hydraulic pump or a target swash plate tilting angle of a swash plate provided in the traveling hydraulic pump depending on the corrected accelerator opening to control the traveling hydraulic pump,
calculating the setting value by a corrected accelerator opening obtained at a previous control cycle, with reference to a table on which the setting value of the cut-off frequency or the time constant according to at least the corrected accelerator opening is described,
calculating a corrected accelerator opening of a current control cycle by correcting the accelerator opening detected by the accelerator opening sensor using the obtained setting value, and
controlling the traveling hydraulic pump by calculating the target maximum absorption torque or the target swash plate tilting angle depending on the corrected accelerator opening of the current control cycle.

12. The method of controlling a forklift equipped with a variable displacement traveling hydraulic pump driven by an engine according to claim 11, the method further comprising:
calculating, with reference to a table on which the setting value of the cut-off frequency or the time constant according to the corrected accelerator opening, the target maximum absorption torque of the traveling hydraulic pump, the target swash plate tilting angle of the swash plate or a vehicle speed of the forklift is described, the setting value by a corrected accelerator opening obtained at a previous control cycle of the traveling hydraulic pump and the target maximum absorption torque or the target swash plate tilting angle, calculating a corrected accelerator opening of a current control cycle by correcting the accelerator opening detected by the accelerator opening sensor using the obtained setting value, and calculating the target maximum absorption torque or the target swash plate tilting angle depending on the corrected accelerator opening of the current control cycle to control the traveling hydraulic pump.

13. The method of controlling a forklift equipped with a variable displacement traveling hydraulic pump driven by an engine according to claim 11, the method further comprising:

in a case where the accelerator opening detected by the accelerator opening sensor decreases, calculating, with reference to a table on which the setting value of the cut-off frequency or the time constant is described, the setting value by a corrected accelerator opening obtained at a previous control cycle and the target maximum absorption torque of the traveling hydraulic pump or the target swash plate tilting angle, the setting value being set in advance depending on the accelerator opening, the target maximum absorption torque of the traveling hydraulic pump, the target swash plate tilting angle of a swash plate provided in the traveling hydraulic pump or a vehicle speed of the forklift, calculating a corrected accelerator opening of a current control cycle by correcting the accelerator opening detected by the accelerator opening sensor using the obtained setting value, and calculating the target maximum absorption torque or the target swash plate tilting angle depending on the corrected accelerator opening of the current control cycle to control the traveling hydraulic pump.

14. The method of controlling a forklift according to claim 13, wherein the setting value of the cut-off frequency or the time constant is determined so that as the target maximum absorption torque, the target swash plate tilting angle or the vehicle speed decreases, responsiveness of the traveling hydraulic pump rises.

15. The method of controlling a forklift according to claim 13, wherein the setting value of the cut-off frequency or the time constant is determined so that as the target maximum absorption torque, the target swash plate tilting angle or the vehicle speed decreases, responsiveness of the traveling hydraulic pump rises, and as the accelerator opening decreases, the responsiveness falls.

16. The method of controlling a forklift according to claim 13, wherein the modulation control unit maintains the target maximum absorption torque or the target swash plate tilting angle used when referring to the table at a value of a timing at which the accelerator opening sensor detects a decrease in the accelerator opening, and when the accelerator opening sensor detects an increase in the accelerator opening, the modulation control unit releases the maintenance.

17. The method of controlling a forklift equipped with a variable displacement traveling hydraulic pump driven by an engine according to claim 11, the method further comprising:

calculating, with reference to a first table on which a first setting value of the cut-off frequency or the time constant according to the corrected accelerator opening, and the target maximum absorption torque of the traveling hydraulic pump, the target swash plate tilting angle of the swash plate or the vehicle speed of the forklift is described, the first setting value by a corrected accelerator opening obtained at a previous control cycle and the target maximum absorption torque of the traveling hydraulic pump or the target swash plate tilting angle, and calculating a corrected accelerator opening of a current control cycle by correcting the accelerator opening detected by the accelerator opening sensor using the obtained first setting value, calculating, with reference to a second table on which a second setting value of the cut-off frequency or the time constant according to the accelerator opening is described, the second setting value by the accelerator opening detected by the accelerator opening sensor and the target maximum absorption torque of the traveling hydraulic pump or the target swash plate tilting angle, and calculating a corrected accelerator opening of a current control cycle by correcting the accelerator opening detected by the accelerator opening sensor using the obtained second setting value, selecting one of the calculations of the first and second setting values to calculate of the current control cycle by correcting the accelerator opening detected by the accelerator opening sensor using corresponding one of the obtained first and second setting values based on an operation amount of the accelerator operation unit, and calculating the target maximum absorption torque or the target swash plate tilting angle depending on the corrected accelerator opening of the current control cycle to control the traveling hydraulic pump.

18. The method of controlling a forklift equipped with a variable displacement traveling hydraulic pump driven by an engine according to claim 11, the method further comprising:

in a case where the accelerator opening detected by the accelerator opening sensor decreases, calculating, with reference to a first table on which a first setting value of the cut-off frequency or the time constant according to the corrected accelerator opening, the target maximum absorption torque of the traveling hydraulic pump, the target swash plate tilting angle of the swash plate or a vehicle speed of the forklift is described, the first setting value by a corrected accelerator opening obtained at a previous control cycle and the target maximum absorption torque of the traveling hydraulic pump or the target swash plate tilting angle and calculating a corrected accelerator opening of a current control cycle by correcting the accelerator opening detected by the accelerator opening sensor using the obtained first setting value, in a case where the accelerator opening detected by the accelerator opening sensor increases, calculating, with reference a second table on which a second setting value of the cut-off frequency and the time constant according to the accelerator opening is described, the second setting value by the accelerator opening detected by the accelerator opening sensor and the target maximum absorption torque of the traveling hydraulic pump or the target swash plate tilting angle, and calculating a corrected accelerator opening of a current control cycle by correcting the accelerator opening detected by the accelerator opening sensor using the obtained second setting value, and calculating the target maximum absorption torque or the target swash plate tilting angle depending on the corrected accelerator opening of the current control cycle to control the traveling hydraulic pump.

19. The method of controlling a forklift according to claim 18, wherein the first setting value of the cut-off frequency or the time constant is determined so that as the target maximum absorption torque, the target swash plate tilting angle or the vehicle speed decreases, responsiveness of the traveling hydraulic pump rises, and the second setting value is determined so that when the accelerator opening increases, as the accelerator opening increases, the responsiveness falls and then rises again.

20. The method of controlling a forklift according to claim 18, wherein the first setting value of the cut-off frequency or the time constant is determined so that as the target maximum absorption torque, the target swash plate tilting angle or the vehicle speed decreases, responsiveness of the traveling hydraulic pump rises, and as the accelerator opening decreases, the responsiveness falls, and the second setting value is determined so that when the accelerator opening increases, as the accelerator opening increases, the responsiveness falls and then rises again.

* * * * *